United States Patent
Ito et al.

(10) Patent No.: US 8,488,433 B2
(45) Date of Patent: Jul. 16, 2013

(54) MODULATED SIGNAL DETECTING APPARATUS AND MODULATED SIGNAL DETECTING METHOD

(75) Inventors: Kiyotaka Ito, Hyogo (JP); Yasumori Hino, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/813,316

(22) PCT Filed: Jun. 11, 2012

(86) PCT No.: PCT/JP2012/003779
§ 371 (c)(1),
(2), (4) Date: Jan. 30, 2013

(87) PCT Pub. No.: WO2012/172769
PCT Pub. Date: Dec. 20, 2012

(65) Prior Publication Data
US 2013/0128709 A1    May 23, 2013

(30) Foreign Application Priority Data
Jun. 17, 2011  (JP) ................................. 2011-135306

(51) Int. Cl.
*G11B 7/00* (2006.01)
(52) U.S. Cl.
USPC .... 369/112.01; 369/103; 369/116; 369/44.14
(58) Field of Classification Search
USPC .................. 369/103, 112.22, 112.01, 112.28, 369/119, 116, 44.37, 44.11
See application file for complete search history.

(56) References Cited

U.S. PATENT DOCUMENTS

| | | | |
|---|---|---|---|
| 6,381,015 B1 * | 4/2002 | Sonehara et al. | ............. 356/497 |
| 7,715,287 B2 | 5/2010 | Shimano et al. | |
| 7,911,889 B2 | 3/2011 | Shimano et al. | |
| 8,098,548 B2 | 1/2012 | Mikami et al. | |
| 2003/0174342 A1 * | 9/2003 | Kawakami et al. | ........... 356/512 |
| 2007/0274171 A1 | 11/2007 | Shimano et al. | |
| 2008/0170479 A1 * | 7/2008 | Shimano et al. | ........... 369/44.11 |

(Continued)

FOREIGN PATENT DOCUMENTS

| | | |
|---|---|---|
| JP | 61-126403 | 6/1986 |
| JP | 2007-317284 | 12/2007 |
| JP | 2009-252337 | 10/2009 |
| WO | 2010/047100 | 4/2010 |

OTHER PUBLICATIONS

International Search Report issued Aug. 28, 2012 in International (PCT) Application No. PCT/JP2012/003779.

*Primary Examiner* — Thang Tran
(74) *Attorney, Agent, or Firm* — Wenderoth, Lind & Ponack, L.L.P.

(57) ABSTRACT

When $ld_0$ denotes an initial optical path length that is a length of an optical path, along which the signal light travels, as converted using a refractive index in vacuum, $lm_0$ denotes an initial optical path length that is a length of an optical path, along which the reference light travels, as converted using a refractive index in vacuum, $\Delta l$ denotes a fluctuation width of a difference in optical path lengths between the signal light and the reference light as converted using a refractive index in vacuum, $\lambda_0$ denotes a central oscillation wavelength of the wavelength-variable laser, and $\Delta\lambda$ denotes an oscillation wavelength variable range of the wavelength-variable laser, then an initial optical path difference $|ld_0 - lm_0|$ satisfies $|ld_0 - lm_0| > (\Delta l/\Delta\lambda)\lambda_0$.

14 Claims, 20 Drawing Sheets

U.S. PATENT DOCUMENTS

| | | | |
|---|---|---|---|
| 2008/0205239 A1* | 8/2008 | Jeong | 369/103 |
| 2008/0205246 A1* | 8/2008 | Shimano et al. | 369/112.16 |
| 2009/0316539 A1 | 12/2009 | Mikami et al. | |
| 2010/0188961 A1 | 7/2010 | Shimano et al. | |
| 2011/0192964 A1 | 8/2011 | Makinouchi et al. | |
| 2012/0008483 A1* | 1/2012 | Mikami | 369/112.17 |

* cited by examiner

MODULATED SIGNAL DETECTING APPARATUS AND MODULATED SIGNAL DETECTING METHOD

TECHNICAL FIELD

The present invention relates to a modulated signal detecting apparatus and a modulated signal detecting method for detecting a modulated signal by detecting interference light resulting from an interference between intensity-modulated or phase-modulated signal light and reference light, and provides a technique that is applicable to an optical disk medium, optical data transmission, optical data communication, object shape measurement using light, and the like.

BACKGROUND ART

Optical disks are widely used as large capacity information recording media. Technological development for increasing capacities of optical disks has proceeded from CDs to DVDs and then to Blu-ray Discs by adopting laser light of shorter wavelengths and objective lenses with higher numerical apertures (NA). Recently, given that services known as cloud services that utilize online storage on the Internet have been expanding year after year, a further capacity enlargement of storages including HDDs (hard disk drives) and flash memories is desired.

The following developments are underway with respect to further capacity enlargement of optical disks.

First, as far as wavelength reduction of laser light is concerned, a semiconductor laser that emits laser light in a 300 nm ultraviolet range has been put to practical use. However, since light in an ultraviolet range equal to or shorter than 300 nm attenuates significantly in air, reducing the wavelength of laser light cannot be expected to produce major benefits.

Next, as far as increasing NA is concerned, a technique has been developed for increasing recording surface density with a system that uses an SIL (solid immersion lens) having an NA of one or higher. In addition, research is being carried out with respect to increasing recording surface density through the use of a near-field light that occurs in a smaller region than a diffraction limit of light. Furthermore, while BD-XL among optical disks currently in the market has three or four recording surfaces, research aimed at enlarging capacity by further increasing the number of recording surface layers is also being conducted.

With the ongoing promotion of capacity enlargement of optical disks as described above, in particular, multi-layering causes a further reduction in signal light amount that is modulated due to reflection by a recording surface of an optical disk and prevents a sufficient S/N of a reproduction signal from being secured. Therefore, increasing an S/N of a detected signal should become essential in pursuing capacity enlargement of optical disks in the future.

Techniques for increasing an S/N of a reproduction signal of an optical disk include a detecting system that uses optical interference. With this detecting system, light from a laser is divided into signal light that is irradiated on an optical disk and reference light that is not irradiated on the optical disk, and interference is performed between reflected light (reproduced light) from the optical disk and the reference light. In addition, a weak signal amplitude of the signal light is amplified by increasing the amount of the reference light. While this technique is advantageous in that a weak reproduced light can be detected at a high S/N, since optical interference is used, a noise component is included in a reproduction signal when phases of the reference light and the reflected light from the optical disk fluctuate. Therefore, further creativeness is required. For example, solutions thereof are disclosed in Patent Literature 1 and Patent Literature 2.

FIG. 21 is a diagram showing a configuration of a conventional interferometric optical disk apparatus.

In Patent Literature 1, in order to stabilize a difference in optical path lengths between a reproduced light and reference light, a mirror drive unit 112 for adjusting an optical path length of the reference light is added to a reference light mirror 111 as shown in FIG. 21. Accordingly, control is performed so that a maximum signal amplitude is always obtained in response to a fluctuation in the optical path length due to camming during rotation of an optical disk 101 or in response to a variation over time in the optical path length due to temperature or the like.

In addition, Patent Literature 2 describes a system in which a corner-cube prism is used as a reference light mirror, the corner-cube prism is mounted on a same actuator as an objective lens, and an optical path length of light to be subjected to interference is adjusted according to an optical disk type or a recording layer to be read.

A decline in the S/N of an optical signal limits progress toward realizing an apparatus with a high transmission rate and high density in the optical disk field. In a similar manner, a high S/N is also necessary in order to realize a high transmission rate in the optical communication field or the optical interface (optical bus or optical USB (universal serial bus)) field. Even in the optical communication field and the optical interface field, in order to achieve a high transmission rate at low power, systems that transmit data by modulating a phase of light generated by a laser are becoming mainstream in place of systems that transmit data by modulating laser intensity. Therefore, techniques that provide optical phase control for accurately controlling a phase of light on a receiving side in order to remove optical phase fluctuation factors that occur on a communication path become important.

When detecting an optical phase using optical interference, an average relative relationship between a phase of signal light to be detected and a phase of light to be used for interference must be precisely controlled. If a constant relationship between an average phase of the signal light to be detected and a phase of the interfering light cannot be maintained, a detection sensitivity of a detected signal declines significantly. Therefore, controlling a phase relationship is extremely important for practical realization of this detecting system.

However, since the wavelength of light ranges from several μm to 400 nm and is extremely short, even a slight variation of an optical path length of interference light and an optical path length of signal light in the order of several ten nm can have a significant impact on signal detection sensitivity. This means that the optical path length of the interference light and the optical path length of the signal light must be kept constant at an accuracy of several ten nm. When a fluctuation factor exists on an optical path length, there is a problem that controlling the optical path length becomes extremely difficult. For example, in the case of an optical disk, an optical path length of a reproduced light from the optical disk varies significantly within a range of around 200 μm due to an effect of undulation of a recording surface of the optical disk. Patent Literature 1 discloses a technique which attempts to avoid this effect by integrating an optical system and having the optical system follow an undulation of a recording surface of an optical disk while correcting gradual fluctuations with an actuator.

However, with the configuration according to Patent Literature 1, when the optical disk tilts and an angle of the signal light varies, an optical path length of the signal light also varies. Tracking fluctuations of the optical path length at an accuracy of several ten nm with an actuator is extremely difficult and, in particular, fluctuations become totally uncontrollable at frequency bands that are higher than a certain level. Therefore, in order to put the technique described in Patent Literature 1 into practice, fluctuation due to undulation of a recording surface of an optical disk must be reduced to almost zero. Such fluctuations have been a major obstacle toward practical realization.

In addition, Patent Literature 2 discloses a configuration in which a corner-cube prism is mounted on an actuator of an objective lens and an optical path of reference light is varied by a same amount as an optical path of signal light. The issue of undulation of a recording surface of an optical disk causing a fluctuation in the optical path length of the reference light and the optical path length of the signal light also applies to the configuration according to Patent Literature 2, making practical realization extremely difficult.

Since the frequency of light is extremely high, an optical phase cannot be directly detected using modern technology. Therefore, an optical phase cannot be detected by any other method than detecting an optical phase using optical interference between signal light and reference light. However, since the wavelength of light used for optical communication, an optical bus, or an optical disk ranges from several μm to 400 nm and is extremely short, the technique described above (a phase detection technique by reference light using optical interference) needs to be a technique that accurately controls average phases of reference light and signal light at several tenths of the wavelength of light. While fluctuation factors of optical phases of reference light and signal light differ among an optical disk, optical communication, and an optical bus, optical phase control in the order of nanometers is required in any case.

CITATION LIST

Patent Literature

Patent Literature 1: Japanese Patent Application Laid-open No. 2007-317284
Patent Literature 2: Japanese Patent Application Laid-open No. 2009-252337

SUMMARY OF THE INVENTION

The present invention has been made in order to solve the issues described above, and an object thereof is to provide a modulated signal detecting apparatus and a modulated signal detecting method capable of detecting a modulated signal at a high S/N ratio.

A modulated signal detecting apparatus according to an aspect of the present invention is a modulated signal detecting apparatus for detecting a modulated signal, having: a wavelength-variable laser which emits laser light and which is capable of varying oscillation wavelengths; an optical divider which splits the laser light emitted from the wavelength-variable laser into signal light and reference light; a reference light mirror which is arranged on an optical path of the reference light; an interference unit which causes an interference between the signal light that has been modulated and the reference light that has been reflected by the reference light mirror; an interference light detecting unit which detects interference light created by the interference unit and which outputs an interference light detection signal; and a wavelength control signal generating unit which generates an oscillation wavelength control signal for controlling an oscillation wavelength of the wavelength-variable laser based on the interference light detection signal, wherein when $ld_0$ denotes an initial optical path length that is a length of an optical path, along which the signal light travels, as converted using a refractive index in vacuum, $lm_0$ denotes an initial optical path length that is a length of an optical path, along which the reference light travels, as converted using a refractive index in vacuum, $\Delta l$ denotes a fluctuation width of a difference in optical path lengths between the signal light and the reference light as converted using a refractive index in vacuum, $\lambda_0$ denotes a central oscillation wavelength of the wavelength-variable laser, and $\Delta \lambda$ denotes an oscillation wavelength variable range of the wavelength-variable laser, then an initial optical path difference $|ld_0 - lm_0|$ satisfies Expression (1) below.

$$|ld_0 - lm_0| > \frac{\Delta l}{\Delta \lambda} \lambda_0 \tag{1}$$

According to this configuration, the wavelength-variable laser which is capable of varying oscillation wavelengths emits laser light. The optical divider splits the laser light emitted from the wavelength-variable laser into signal light and reference light. The reference light mirror is arranged on an optical path of the reference light. The interference unit causes an interference between the signal light that has been modulated and the reference light that has been reflected by the reference light mirror. The interference light detecting unit detects interference light created by the interference unit and outputs an interference light detection signal. The wavelength control signal generating unit generates an oscillation wavelength control signal for controlling an oscillation wavelength of the wavelength-variable laser based on the interference light detection signal. In this case, if $ld_0$ denotes an initial optical path length that is a length of an optical path along which the signal light travels as converted using a refractive index in vacuum, $lm_0$ denotes an initial optical path length that is a length of an optical path along which the reference light travels as converted using a refractive index in vacuum, $\Delta l$ denotes a fluctuation width of a difference in optical path lengths between the signal light and the reference light as converted using a refractive index in vacuum, $\lambda_0$ denotes a central oscillation wavelength of the wavelength-variable laser, and $\Delta \lambda$ denotes an oscillation wavelength variable range of the wavelength-variable laser, then an initial optical path difference $|ld_0 - lm_0|$ satisfies Expression (1) above.

According to the present invention, due to the initial optical path difference between the signal light and the reference light satisfying Expression (1) above and the oscillation wavelength being controlled within the oscillation wavelength variable range of the wavelength-variable laser, a fluctuation component of optical path lengths of the signal light and the reference light can be canceled out and a modulated signal with a high S/N ratio can be detected.

The above and other objects, features, and advantages of the present invention will become more apparent in the following detailed description and the accompanying drawings.

DESCRIPTION OF EMBODIMENTS

Hereinafter, embodiments of the present invention will be described with reference to the accompanying drawings. Moreover, the following embodiments are merely embodied examples of the present invention and are not intended to limit the technical scope of the present invention.

Components and principles thereof which are common to first to seventh embodiments will be first described with reference to FIGS. 1 to 3, followed by specific descriptions of the respective embodiments.

Figure 1:
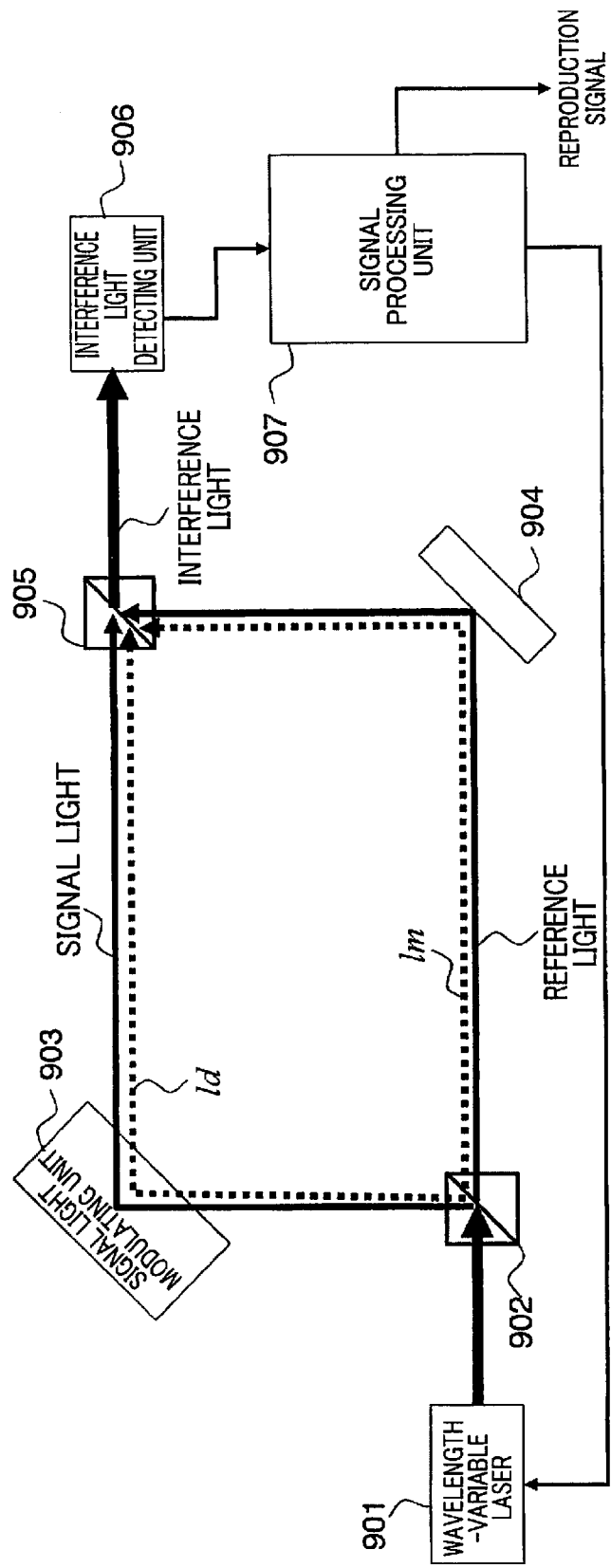
FIG. 1 is a diagram showing an example of a schematic configuration of a modulated signal detecting apparatus according to the present embodiment.

FIG. 1 is a diagram showing an example of a schematic configuration of a modulated signal detecting apparatus according to the present embodiment. The modulated signal detecting apparatus shown in FIG. 1 comprises a wavelength-variable laser 901, an optical dividing unit 902, a signal light modulating unit 903, a reference light mirror 904, an interference unit 905, an interference light detecting unit 906, and a signal processing unit 907.

In FIG. 1, laser light emitted from the wavelength-variable laser 901 is divided into signal light and reference light by the optical dividing unit 902. An intensity or a phase of the signal light is modulated by the signal light modulating unit 903. The modulated signal light is transmitted through or reflected by the signal light modulating unit 903 and proceeds toward the interference unit 905. On the other hand, the reference light is reflected by the reference light mirror 904 and proceeds toward the interference unit 905.

The signal light modulating unit 903 can adopt various modes as long as a function is provided for modulating an optical phase of a reproduced light. With an optical disk apparatus, for example, an optical disk medium corresponds to the signal light modulating unit 903 and signal light is modulated by irregularities of recording pits formed on the optical disk medium. In addition, with optical communication or an optical bus, an optical phase modulator that modulates a phase of light in accordance with transmission data corresponds to the signal light modulating unit 903. Furthermore, with a detecting apparatus that detects a surface shape of an object, for example, the object corresponds to the signal light modulating unit 903 and signal light is modulated by irregularities on a surface of the object whose surface shape is to be detected.

Now, let us assume that ld denotes an optical path length of the signal light that is a path (optical path length) along which the signal light, after being divided by the optical dividing unit 902, travels until reaching the interference unit 905 via the signal light modulating unit 903 as converted using a refractive index in vacuum n (n=1). In a similar manner, let us assume that lm denotes an optical path length of the reference light that is a path (optical path length) along which the reference light, after being divided by the optical dividing unit 902, travels until reaching the interference unit 905 via the reference light mirror 904 as converted using a refractive index in vacuum n (n=1).

The interference unit 905 multiplexes the signal light and the reference light and outputs interference light. The interference light detecting unit 906 detects the interference light, converts the detected interference light into an electrical signal, and outputs the electrical signal as an interference light detection signal. The signal processing unit 907 performs signal processing on the interference light detection signal.

The interference light detection signal includes intensities of the signal light and the reference light, and information on a phase difference as modulated by the signal light modulating unit 903. The detected information on a phase difference includes a factor that causes fluctuation of a phase of light due to the influence of various disturbances that occur on the signal light path and the reference light path in addition to the signal modulated by the signal light modulating unit 903. The wavelength of light ranges from several μm to 400 nm and is extremely short. Therefore, even a small disturbance may cause a variation in the phase of light and may become a significant noise factor. Furthermore, an extremely large number of factors including a fluctuation in the wavelength of the laser light, a subtle fluctuation in the refractive index, a subtle tilt of an element due to vibration, and a variation in temperature become phase fluctuation factors.

Generally, since these fluctuation factors attenuate at 12 dB/Oct with respect to frequency, many disturbance elements concentrate at low frequencies. These fluctuation factors can be removed to a certain degree by detecting a low-frequency component of phase information of light detected by the interference light detecting unit 906 and adjusting an optical path length so as to suppress fluctuations. Patent Literature 1 discloses a configuration in which a mechanically-movable mirror is provided on an optical path of reference light and a position of the mirror is controlled in order to remove fluctuation of the low-frequency component.

However, since a mechanically-operated mirror is used in Patent Literature 1, a fluctuation frequency band that can be removed becomes lower. More problematically, mirror position control at an accuracy of a few tenths or less of the wavelength of light (nanometer accuracy) and stable mirror angle control are required. Therefore, since the amount of disturbances and frequency bands that can be controlled and control accuracy thereof are insufficient, when detecting a phase of light using interference, realizing an inexpensive apparatus that can be applied to a wide range of applications has been difficult due to technical limitations and limitations regarding applicable range.

As advanced technology in the optical communication field, a method of controlling a low-frequency component of detected phase information by varying laser wavelength is used as a method of improving control performance. However, since control gain must be increased in order to remove a major phase fluctuation factor, there is a problem in that control gain cannot be secured unless a laser wavelength range is increased. The present invention provides a technique for solving this problem. Hereinafter, this solution will be briefly explained.

As shown in FIG. 1, if ld denotes an optical path length of the signal light and lm denotes an optical path length of the reference light, then a difference in optical path lengths between the split signal light and reference light may be expressed as $|ld-lm|$. In addition, if $\lambda_o$ denotes an oscillation wavelength of the wavelength-variable laser 901, an interference in which the signal light and the reference light are in phase at the interference unit 905 and a signal becomes maximum can be produced when conditional expression (2) below is satisfied.

$$|ld-lm|=k\lambda_o \text{ (where } k \text{ is 0 or a positive integer)} \quad (2)$$

At this point, if a difference in initial optical path lengths $|ld_0-lm_0|$ denotes a center value of a fluctuation of optical path difference when a fluctuation width of a maximum difference in optical path lengths in the modulated signal detecting apparatus is denoted by $\Delta l$ (where $\Delta l$ represents a fluctuation width of a difference in optical path lengths between the signal light and the reference light as converted using a refractive index in vacuum), by substituting $|ld_0-lm_0|$ into Expression (2) above, k can be obtained as Expression (3) below.

$$k = \frac{|ld_0 - lm_0|}{\lambda_o} \quad (3)$$

In order to absorb the fluctuation width $\Delta l$ of a difference in optical path lengths within an oscillation wavelength variable range $\Delta\lambda$, relational expression (4) below need only be satisfied.

$$|ld_0-lm_0|+\Delta l=k(\lambda_o+\Delta\lambda) \quad (4)$$

By substituting Expression (3) into Expression (4) and rearranging Expression (4), Expression (5) below is derived.

$$\Delta l = \frac{|ld_0 - lm_0|}{\lambda_o}\Delta\lambda \quad (5)$$

Accordingly, in order to absorb the fluctuation width $\Delta l$ of a difference in optical path lengths within the oscillation wavelength variable range $\Delta\lambda$, a left-hand side must be greater than a right-hand-side in Expression (5). Therefore, by replacing an equality sign in Expression (5) with an inequality sign and rearranging Expression (5), Expression (6) below is derived.

$$|ld_0 - lm_0| > \frac{\Delta l}{\Delta\lambda}\lambda_o \quad (6)$$

The fluctuation width $\Delta l$ of the difference in optical path lengths may be expressed as a product of the oscillation wavelength variable range $\Delta\lambda$ and $|ld_0-lm_0|/\lambda_o$. Therefore, by designing a large $|ld_0-lm_0|$ that is an optical path difference between the reference light and the signal light, an extremely large fluctuation of optical path difference can be absorbed by a small wavelength variation.

Figure 2:
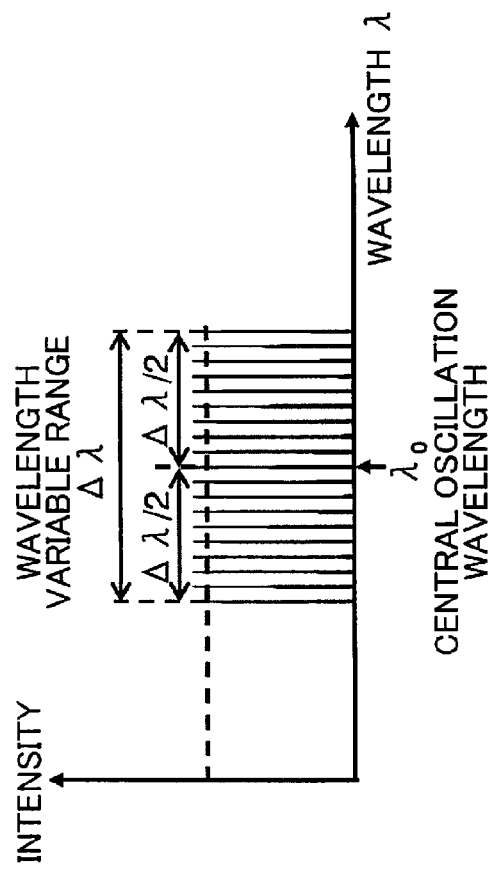
FIG. 2 is a diagram for describing a central oscillation wavelength and an oscillation wavelength variable range of a wavelength-variable laser.

FIG. 2 is a diagram for describing a central oscillation wavelength and an oscillation wavelength variable range of a wavelength-variable laser. As a commonly-adopted configuration of a wavelength-variable laser, a method is used in which a refractive index of a waveguide of a semiconductor laser is varied by applying a voltage to a part of the waveguide from outside. An oscillation wavelength variable range $\Delta\lambda$ of such a general wavelength-variable laser is around 10 nm. Therefore, when there is no optical path difference between the reference light and the signal light, phase fluctuation can only be controlled within a range of about 10 nm. In contrast, for example, by adopting a configuration where the wavelength of light is 400 nm and $|ld_0-lm_0|$ is 0.4 mm, tracking can be performed on a fluctuation of optical path difference that is thousand times greater.

As described above, since a gain per a same wavelength variation can be increased by adopting a configuration which is provided in advance with an optical path difference between an optical path of reference light and an optical path of signal light, a gain of a control system can be readily increased. If the gain of the control system increases, control residue is reduced and control performance is enhanced. In a system where the fluctuation width $\Delta l$ of the difference in optical path lengths can be predicted, if the relationship represented by Expression (6) is satisfied, the fluctuation width $\Delta l$ of the difference in optical path lengths can be absorbed by the control system. In addition, the greater the difference in initial optical path lengths $|ld_0-lm_0|$, the higher the effect of suppressing the fluctuation width $\Delta l$ of the difference in optical path lengths.

Figure 3:
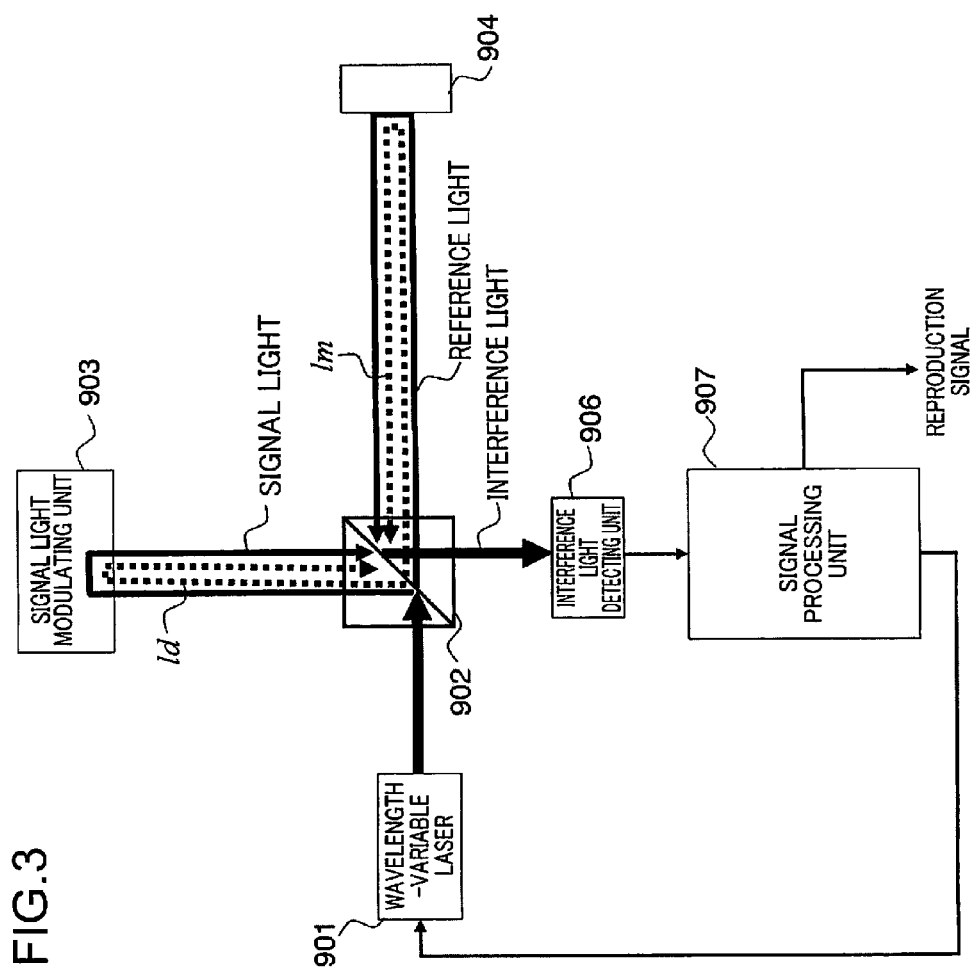
FIG. 3 is a diagram showing another example of a schematic configuration of a modulated signal detecting apparatus according to the present embodiment.

Moreover, while the description above has been given with reference to a configuration such as that shown in FIG. 1, even with a configuration such as that shown in FIG. 3, reference light and signal light have a similar relationship and a similar operational effect can be produced even with a configuration such as that shown in FIG. 3.

FIG. 3 is a diagram showing another example of a schematic configuration of the modulated signal detecting apparatus according to the present embodiment. The modulated signal detecting apparatus shown in FIG. 3 comprises a wavelength-variable laser 901, an optical dividing unit 902, a signal light modulating unit 903, a reference light mirror 904, an interference light detecting unit 906, and a signal processing unit 907. In FIG. 3, same components as those shown in FIG. 1 are denoted by same reference numerals and descriptions thereof will be omitted.

In FIG. 3, laser light emitted from the wavelength-variable laser 901 is divided into signal light and reference light by the optical dividing unit 902. An intensity or a phase of the signal light is modulated by the signal light modulating unit 903. The modulated signal light is reflected by the signal light modulating unit 903 and proceeds toward the optical dividing unit 902. On the other hand, the reference light is reflected by the reference light mirror 904 and proceeds toward the optical dividing unit 902.

With the modulated signal detecting apparatus shown in FIG. 3, the function of the interference unit 905 shown in FIG. 1 is assumed by the optical dividing unit 902. The optical dividing unit 902 divides light from the wavelength-variable laser 901 into signal light and reference light, and causes interference between the signal light modulated by the signal light modulating unit 903 and the reference light reflected by the reference light mirror 904.

The optical dividing unit 902 multiplexes the signal light and the reference light and outputs interference light. The interference light detecting unit 906 detects the interference light, converts the detected interference light into an electrical signal, and outputs the electrical signal as an interference light detection signal. The signal processing unit 907 performs signal processing on the interference light detection signal.

First Embodiment

Figure 4:
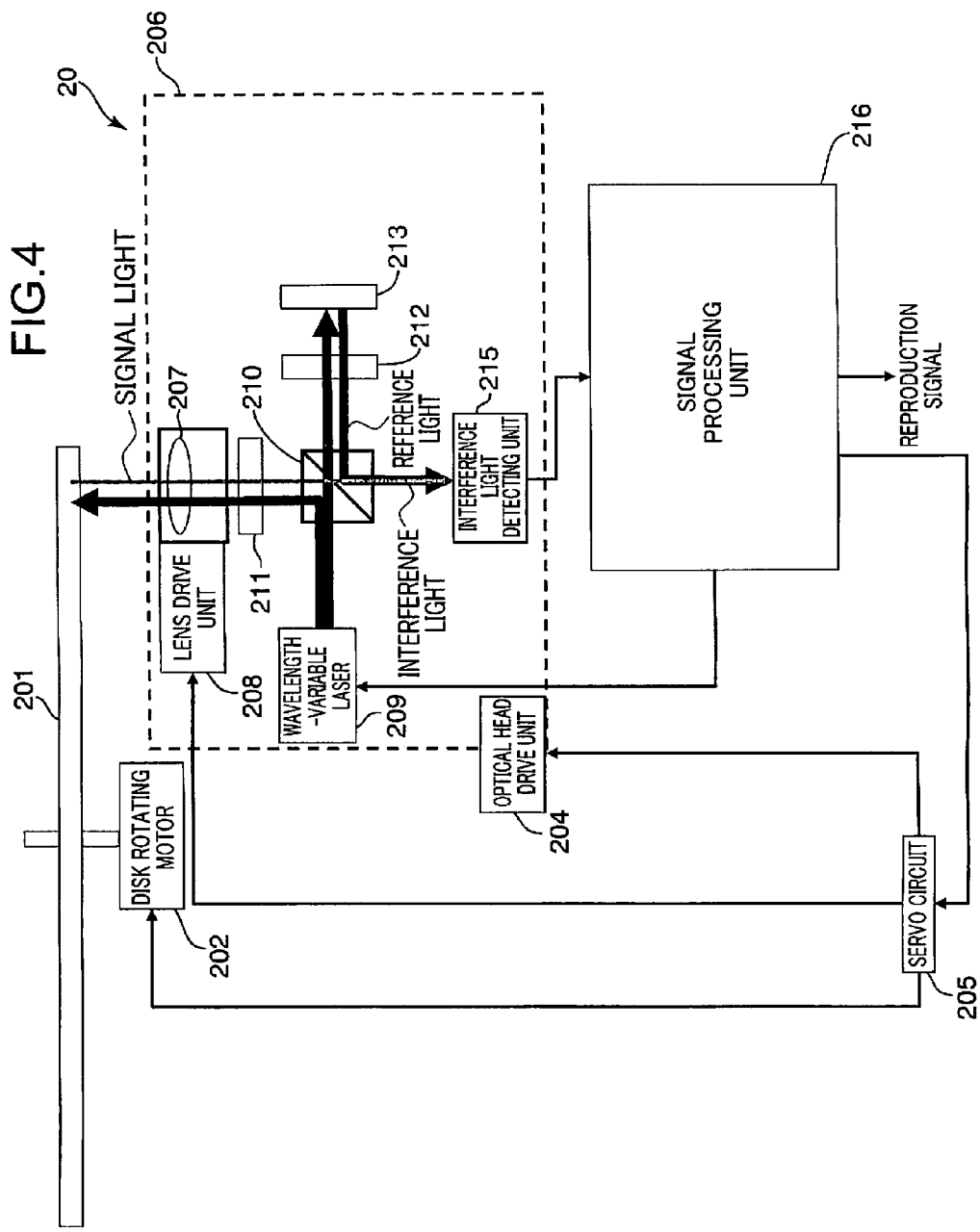
FIG. 4 is a diagram showing a configuration of an optical disk apparatus according to a first embodiment of the present invention.

FIG. 4 is a diagram showing a configuration of an optical disk apparatus according to a first embodiment of the present invention.

In FIG. 4, using a clock signal generated from an optical disk medium 201 on which information is recorded, an optical disk apparatus 20 reproduces data from the optical disk medium 201 or records data onto the optical disk medium 201.

The optical disk apparatus 20 comprises a disk rotating motor 202, an optical head drive unit 204, a servo circuit 205, an optical head unit 206, and a signal processing unit 216. The servo circuit 205 uses a servo error signal to control a lens drive unit 208 so that a focus state and a scan state of an optical beam at an objective lens 207 become optimum. In addition, the servo circuit 205 controls the optical head drive unit 204 so that the optical head unit 206 moves to an optimal radius position of the optical disk medium 201. Furthermore, the servo circuit 205 optimally controls the number of revolutions of the disk rotating motor 202 based on a radius position on the optical disk medium 201 on which the optical beam is irradiated.

Figure 5:
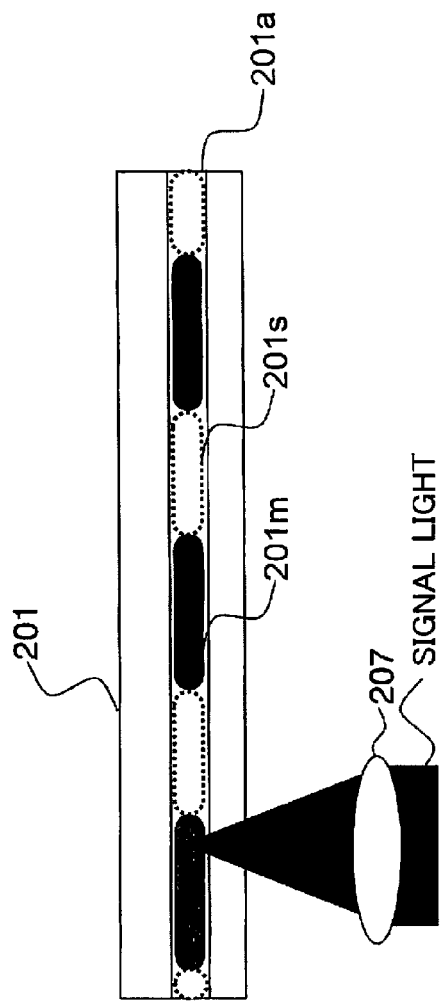
FIG. 5 is a diagram for describing an example in which an intensity of signal light is modulated in an optical disk medium.
Figure 6:
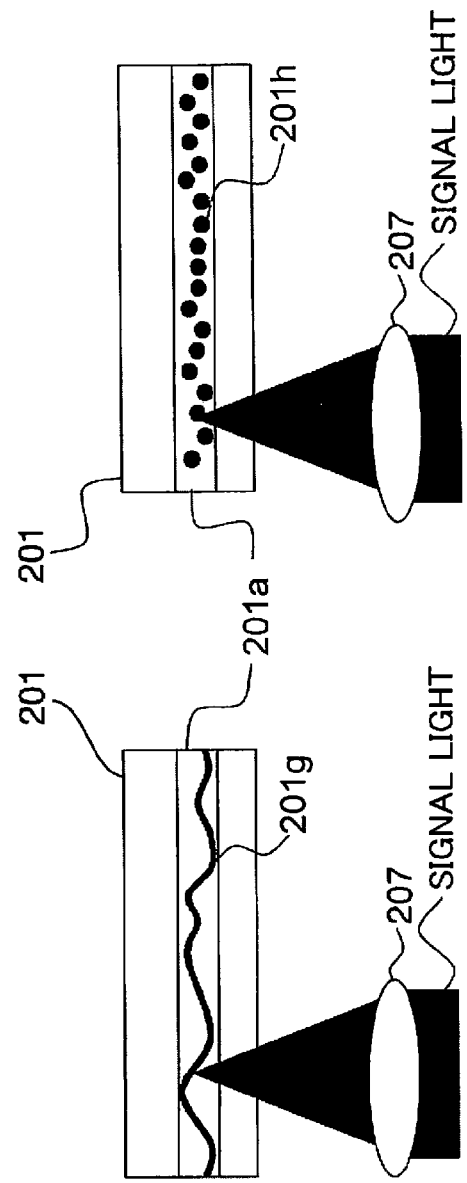
FIG. 6 is a diagram for describing an example in which a phase of signal light is modulated in an optical disk medium.

The optical disk medium 201 has at least one or more data recording surfaces. Tracks are formed on the data recording surface and information is recorded on the tracks according to a predetermined data format. FIGS. 5 and 6 are diagrams for describing signal light modulation at the optical disk medium 201. FIG. 5 is a diagram for describing an example in which an intensity of signal light is modulated at the optical disk medium 201, and FIG. 6 is a diagram for describing an example in which a phase of signal light is modulated at the optical disk medium 201.

First, an example in which the intensity of signal light is modulated at the optical disk medium 201 will be described with reference to FIG. 5. Data is recorded as a mark 201m and a space 201s with mutually different reflectances are formed on a track on a recording surface 201a. When the signal light is irradiated on the mark 201m and the space 201s, the signal light with its intensity modulated due to a variation in reflectances of the mark 201m and the space 201s is reflected.

Next, an example in which the phase of signal light is modulated at the optical disk medium 201 will be described with reference to FIG. 6. Data is recorded as a continuous groove 201g or a discrete hole 201h with a varied transmittance or refractive index is formed inside the recording surface 201a. When the signal light is irradiated on the groove 201g or the hole 201h, due to a difference in distances from incidence to the optical disk medium 201 to reaching a position of reflection, the signal light with a modulated phase is reflected.

The disk rotating motor 202 rotates the optical disk medium 201 at a specified number of revolutions. The optical head unit 206 has a wavelength-variable laser 209, a polarizing beam splitter 210, λ/4 plates 211 and 212, a reference light mirror 213, the objective lens 207, the lens drive unit 208, and an interference light detecting unit 215. The optical head unit 206 irradiates an optical beam to the optical disk medium 201, detects light resulting from an interference between the signal light reflected by the optical disk medium 201 and reference light while scanning tracks, and outputs an electrical signal.

The wavelength-variable laser 209 emits laser light. If $\lambda_0$ denotes a central oscillation wavelength and $\Delta\lambda$ denotes an oscillation wavelength variable range in which oscillation can be performed at an arbitrary intensity or higher, then the wavelength-variable laser 209 is capable of varying oscillation wavelengths within a range expressed as $\lambda_0 \pm (\Delta\lambda/2)$ by an oscillation wavelength control signal.

The polarizing beam splitter 210 splits light emitted from the wavelength-variable laser 209 into signal light and reference light. In addition, the polarizing beam splitter 210 causes an interference between the signal light modulated by the optical disk medium 201 arranged on an optical path of the signal light and the reference light reflected by the reference light mirror 213.

The polarizing beam splitter 210 transmits approximately 100% of horizontally-polarized light and reflects approximately 100% of perpendicularly-polarized light which are incident to a separation plane. The polarizing beam splitter 210 divides laser light emitted from the wavelength-variable laser 209 into a perpendicularly-polarized signal light and a horizontally-polarized reference light. In addition, polarization directions of the divided signal light and reference light are rotated by 90 degrees due to the signal light and the reference light twice passing through the λ/4 plates 211 and 212 positioned on respective optical paths thereof, and the signal light and the reference light return to the polarizing beam splitter 210. At this point, since the polarization directions of the signal light and the reference light have respectively been rotated by 90 degrees, contrary to during division, the polarizing beam splitter 210 transmits approximately 100% of the signal light that has become horizontally polarized light and reflects approximately 100% of the reference light that has become perpendicularly-polarized light. Accordingly, light from the polarizing beam splitter 210 becomes interference light between the signal light and the reference light which have polarization planes that are perpendicular to each other.

In this case, the polarization plane of the laser light incident to the polarizing beam splitter 210 is capable of varying an intensity ratio between the signal light and the reference light by arranging the wavelength-variable laser 209 that has been rotated in advance.

The objective lens 207 focuses the signal light onto the optical disk medium 201 and converts the signal light reflected by the optical disk medium 201 into a parallel light. The signal light converted into a parallel light retraces the optical path of the signal light during its approach. In addition, the objective lens 207 is driven in a focusing direction and a tracking direction by the lens drive unit 208.

Through transmission, the λ/4 plates 211 and 212 convert a linearly-polarized light into a circularly-polarized light and a circularly-polarized light into a linearly-polarized light. By being transmitted through the λ/4 plates 211 and 212 twice, a linearly-polarized light becomes a linearly-polarized light having a polarization plane rotated by 90 degrees. For example, perpendicularly-polarized light is converted into horizontally polarized light and horizontally polarized light is converted into perpendicularly-polarized light.

The reference light mirror 213 is arranged on the optical path of the reference light and reflects approximately 100% of the reference light divided from the laser light. The reference light reflected by the reference light mirror 213 returns along a same optical path as during its approach.

An arrangement of the reference light mirror 213 will now be described. If an initial optical path length that is a length of an optical path along which the signal light travels as converted using a refractive index in vacuum is expressed by $ld_0$ and an initial optical path length that is a length of an optical path along which the reference light travels as converted using a refractive index in vacuum is expressed by $lm_0$, then a difference in initial optical path lengths is expressed by $|ld_0-lm_0|$. The length of the optical path along which the signal light travels is a path that starts upon division by the polarizing beam splitter 210 and ends back at the polarizing beam splitter 210 via the optical disk medium 201, and the length of the optical path along which the reference light travels is a path that starts upon division by the polarizing beam splitter 210 and ends back at the polarizing beam splitter 210 via the reference light mirror 213.

Based on a relationship among the central oscillation wavelength $\lambda_0$ of the wavelength-variable laser 209, the oscillation wavelength variable range $\Delta\lambda$ of the wavelength-variable laser 209, and the fluctuation width $\Delta l$ of the difference in optical path lengths between the signal light and the reference light as converted using the refractive index in vacuum which occurs due to a camming fluctuation of the optical disk medium 201 or a vibration of the optical head unit 206, the reference light mirror 213 is arranged so that the initial optical path length $lm_0$ satisfies Expression (6) above. In this case, the initial optical path length $ld_0$ is calculated using a center value of a fluctuation in optical path length that occurs due to a camming fluctuation of the optical disk medium 201 or a vibration of the optical head unit 206. In other words, an optical path length that is the optical path length of the signal light as converted using a refractive index in vacuum n (n=1) varies within a range expressed as $ld_0\pm(\Delta l/2)$.

The interference light detecting unit 215 detects interference light resulting from the interference between the signal light reflected by the optical disk medium 201 and the reference light, converts the detected interference light into an electrical signal, and outputs the electrical signal as an interference light detection signal.

Figure 7:
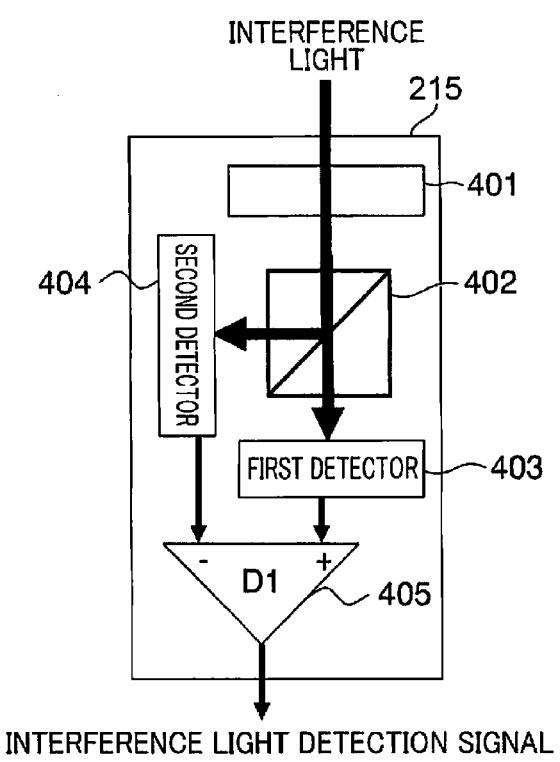
FIG. 7 is a diagram showing an example of a specific configuration of an interference light detecting unit according to the first embodiment.

FIG. 7 is a diagram showing an example of a specific configuration of the interference light detecting unit 215 according to the first embodiment. The interference light detecting unit 215 shown in FIG. 7 has a λ/2 plate 401, a polarizing beam splitter 402, a first detector 403, a second detector 404, and a differential signal calculating unit 405.

The λ/2 plate 401 rotates a polarization direction of an incident interference light by 45 degrees. Among the interference light whose polarization direction has been rotated by 45 degrees, the polarizing beam splitter 402 transmits approximately 100% of horizontally-polarized light incident and reflects approximately 100% of perpendicularly-polarized light. The first detector 403 and the second detector 404 are elements that output an electrical signal corresponding to incident light amount. The first detector 403 detects horizontally polarized light of the interference light whose polarization direction has been rotated by 45 degrees, and outputs an electrical signal corresponding to the light amount. The second detector 404 detects perpendicularly-polarized light of the interference light whose polarization direction has been rotated by 45 degrees, and outputs an electrical signal corresponding to the light amount. The differential signal calculating unit 405 outputs a differential signal between the electrical signal outputted from the first detector 403 and the electrical signal outputted from the second detector 404.

A polarization state of the interference light may be expressed by a Jones vector as follows.

$$\begin{pmatrix} E_d \\ E_m \end{pmatrix}$$

$E_d$ denotes an electrical field of the signal light reflected by the optical disk medium 201 and $E_m$ denotes an electrical field of the reference light reflected by the reference light mirror 213. In addition, a first component of the vector described above represents horizontally polarized light and a second component represents perpendicularly-polarized light. When the light is transmitted through the λ/2 plate 401, the Jones vector becomes as follows.

$$\begin{pmatrix} \cos 45° & \sin 45° \\ \sin 45° & -\cos 45° \end{pmatrix} \begin{pmatrix} E_d \\ E_m \end{pmatrix} = \begin{pmatrix} (E_d + E_m)/\sqrt{2} \\ (E_d - E_m)/\sqrt{2} \end{pmatrix}$$

Next, an electrical field of a light transmitted through the polarizing beam splitter 402 (horizontally-polarized light) and an electrical field of a light reflected by the polarizing beam splitter 402 (perpendicularly-polarized light) are respectively expressed by Expression (7) below.

transmitted (horizontally-polarized light): $(E_d+E_m)/\sqrt{2}$ reflected (perpendicularly-polarized light): $(E_d-E_m)/\sqrt{2}$ (7)

Accordingly, detected signals of the first detector 403 and the second detector 404 are expressed by Expression (8) below.

first detector 403: $\eta|(E_d + E_m)/\sqrt{2}|^2 =$ (8)

$$\eta\left(\frac{1}{2}|E_d|^2 + \frac{1}{2}|E_m|^2 + |E_d E_m|\cos\Delta\phi\right)$$

second detector 404: $\eta|(E_d - E_m)/\sqrt{2}|^2 =$ $$\eta\left(\frac{1}{2}|E_d|^2 + \frac{1}{2}|E_m|^2 - |E_d E_m|\cos\Delta\phi\right)$$

In Expression (8), $\eta$ denotes a conversion efficiency of a detector and $\Delta\phi$ denotes a phase difference based on a difference in optical path lengths between signal light and reference light. Expression (9) below represents a differential signal obtained by the differential signal calculating unit 405 based on these detected signals.

$$2\eta |E_d||E_m| \cos \Delta\phi \quad (9)$$

Expression (9) represents a total multiplication of the electrical field of the signal light reflected by the optical disk medium 201, the electrical field of the reference light, and a component of phase fluctuation including signal modulation. The multiplication of the electrical field of the signal light and the electrical field of the reference light indicates that the electrical field of the signal light has been amplified by the electrical field of the reference light. Therefore, even in a case where $E_d$ is reduced due to a low reflectance of the optical disk medium 201 and a correct reproduction signal cannot be obtained even by solely detecting the signal light, by amplifying the signal, a correct reproduction signal can be obtained.

However, $\Delta\phi$ in Expression (9) can be roughly divided into $\Delta\phi 1$ that is a reproduction signal component and $\Delta\phi 2$ that is a fluctuation component of an optical path which occurs due to various factors. Normally, a fluctuation component of an optical path is several thousand times greater than the wavelength of light. Since the reproduction signal component $\Delta\phi 1$ is in the order of the wavelength of light, a reproduction signal is completely undetectable unless stable control is performed so that the fluctuation component $\Delta\phi 2$ equals zero. In order to realize such high-precision control, the optical disk apparatus according to the present embodiment feeds back a detected optical path fluctuation component to the wavelength-variable laser 209 and achieves removal of the fluctuation component $\Delta\phi 2$ by this control loop. This method of removing a fluctuation component will be described below.

The signal processing unit 216 processes an interference light detection signal. Based on the interference light detection signal, the signal processing unit 216 generates a reproduction signal for reproducing data recorded on the optical disk medium 201, a servo error signal for controlling the disk rotating motor 202, the optical head drive unit 204, and the lens drive unit 208, and an oscillation wavelength control signal for controlling an oscillation wavelength of the wavelength-variable laser 209. The reproduction signal is separated from a phase fluctuation component (optical path fluctuation component) as a result of inputting the interference light detection signal outputted from the interference light detecting unit 215 and extracting a band of a modulated signal component using a high-pass filter (HPS). A specific configuration thereof will now be described with reference to FIG. 8.

Figure 8:
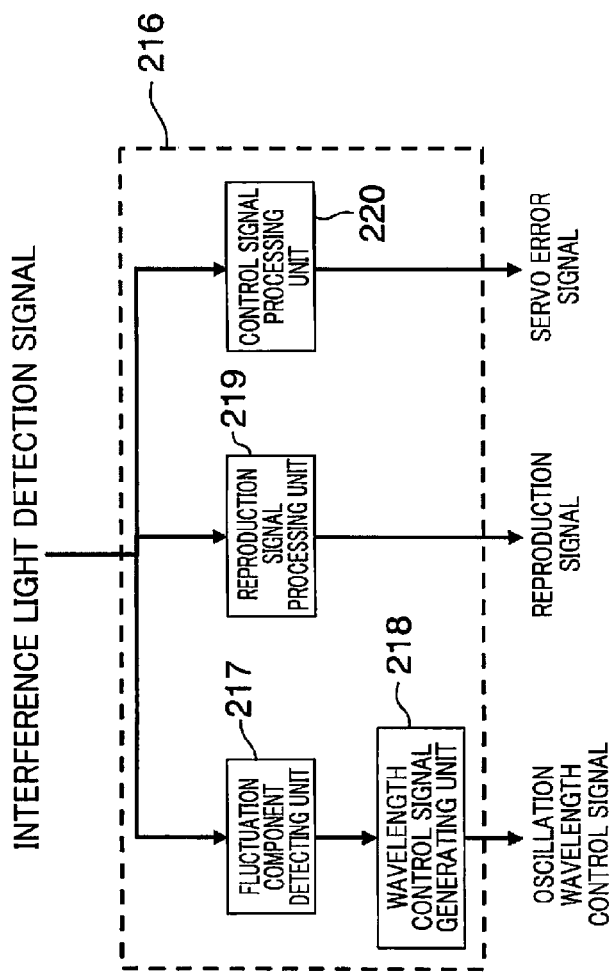
FIG. 8 is a diagram showing an example of a specific configuration of a signal processing unit according to the first embodiment.

FIG. 8 is a diagram showing an example of a specific configuration of the signal processing unit 216 according to the first embodiment. The signal processing unit 216 shown in FIG. 8 has a fluctuation component detecting unit 217, a wavelength control signal generating unit 218, a reproduction signal processing unit 219, and a control signal processing unit 220.

In the present embodiment, a modulation code is designed so that a frequency band of a modulated signal and a frequency band of a phase fluctuation component do not overlap each other in advance. Therefore, a reproduction signal can be separated by such a simple configuration using an HPF. The fluctuation component detecting unit 217 can also be realized by a simple method involving extracting a low-frequency signal of the interference light detection signal detected by the interference light detecting unit 215 with a low-pass filter (LPF). However, in this case, since the reproduction signal must be prevented from leaking into a control signal, a band of the reproduction signal and a band of the phase fluctuation component must be clearly separated from each other. Therefore, an LPF with a steep filter characteristic must be inserted and, in order to remove a phase fluctuation in a stable manner, a control frequency characteristic must be set to around $\frac{1}{10}$ of the LPF band. More superior methods of separating a phase fluctuation component by the fluctuation component detecting unit 217 includes a method of invariably sampling a particular level (for example, a zero cross point of the interference light detection signal from the interference light detecting unit 215) from an interference light detection signal.

In this manner, the phase fluctuation component detected by the fluctuation component detecting unit 217 is subjected to feedback control by the wavelength control signal generating unit 218 at a predetermined gain so that phase fluctuation as a variation in laser wavelength is suppressed. The present embodiment is configured so as to detect a phase of light and feed back the phase to a wavelength (frequency) of the light. Therefore, acquisition characteristics or gain characteristics after control of the wavelength control signal generating unit 218 are similar to a phase-locked loop (PLL) that is adopted as a phase locking technique for electrical signals. A PLL according to the present embodiment is therefore an optical PLL that varies a wavelength of light to control a phase of the light. By using a lag-lead filter on a signal that is fed back to the wavelength of laser, acquisition characteristics can be improved in a similar manner to a general PLL.

A coefficient of $|ld_0 - lm_0|/\lambda_0$ obtained by Expression (5) is expressed in the form of a product in a transfer function of an optical PLL. Therefore, by increasing $|ld_0 - lm_0|/\lambda_0$, the control gain of feedback can be sufficiently increased even in a case of a laser with limited wavelength variation. Once the control gain can be increased, a phase fluctuation component can be significantly suppressed as in the present embodiment. In the present embodiment, while a predetermined value is set as a control target of the wavelength control signal generating unit 218, it is obvious that a variable control target can be adopted so that a maximum reproduction signal is obtained or that control can be performed so that a signal volume of the reproduction signal processing unit 219 reaches maximum.

Moreover, when signal modulation by the optical disk medium 201 is intensity modulation, the fluctuation component detecting unit 217 may generate a fluctuation component signal that represents a fluctuation noise component for all frequency bands that can be accommodated by a wavelength-varying response speed of the wavelength-variable laser 209. The wavelength control signal generating unit 218 generates an oscillation wavelength control signal for controlling an oscillation wavelength of the wavelength-variable laser 209 based on the interference light detection signal. The wavelength control signal generating unit 218 generates an oscillation wavelength control signal based on a fluctuation component of a band other than the modulated signal band modulated by the optical disk medium 201 which is detected from the interference light detection signal. The wavelength control signal generating unit 218 generates an oscillation wavelength control signal for controlling an oscillation wavelength of the wavelength-variable laser 209 based on the fluctuation component signal outputted from the fluctuation component detecting unit 217.

The reproduction signal processing unit 219 reproduces data recorded on the optical disk medium 201 by generating a reproduction signal from the interference light detection signal. The reproduction signal processing unit 219 removes a fluctuation component from the interference light detection signal outputted by the interference light detecting unit 215, and generates and outputs a reproduction signal. For example, by using an HPF (high-pass filter) on a noise due to camming of the optical disk medium 201 which is one of the factors that create a fluctuation component, the reproduction signal processing unit 219 can suppress the fluctuation component and retrieve a reproduction signal with a favorable S/N.

The control signal processing unit 220 generates a servo error signal based on the interference light detection signal outputted by the interference light detecting unit 215 and outputs the servo error signal to the servo circuit 205.

According to this configuration, due to an initial optical path difference between signal light and reference light satisfying Expression (6) above and an oscillation wavelength being controlled within an oscillation wavelength variable range of the wavelength-variable laser 209, an optical path fluctuation component can be canceled out.

Moreover, in the present embodiment, the optical disk apparatus 20 corresponds to an example of the modulated signal detecting apparatus, the wavelength-variable laser 209 corresponds to an example of the wavelength-variable laser, the polarizing beam splitter 210 corresponds to an example of the optical divider, the reference light mirror 213 corresponds to an example of the reference light mirror, the polarizing beam splitter 210 corresponds to an example of the interference unit, the interference light detecting unit 215 corresponds to an example of the interference light detecting unit, the fluctuation component detecting unit 217 and the wavelength control signal generating unit 218 correspond to an example of the wavelength control signal generating unit, and the reproduction signal processing unit 219 corresponds to an example of the reproduction signal processing unit.

While a position of the reference light mirror 213 in a direction of an optical axis is adjusted so that the initial optical path length $lm_0$ of the reference light satisfies Expression (6) in the present embodiment, the present invention is not limited thereto. Only the initial optical path length $ld_0$ of the signal light or both the initial optical path length $lm_0$ of the reference light and the initial optical path length $ld_0$ of the signal light may be varied so as to satisfy Expression (6). For example, an arrangement position of the optical disk medium 201 may be varied so that the initial optical path length $ld_0$ of the signal light satisfies Expression (6). In addition, the initial optical path length $ld_0$ of the signal light may be adjusted so as to satisfy Expression (6) by arranging a bypass or an element with a high refractive index on the optical path of the signal light and increasing the optical path length as converted using a refractive index in vacuum.

Furthermore, while the polarization plane of the laser light incident to the polarizing beam splitter 210 is adapted so as to be capable of varying an intensity ratio between the signal light and the reference light by arranging the wavelength-variable laser 209 that has been rotated in advance in a plane perpendicular to the optical axis, the present invention is not limited thereto. For example, a λ/2 plate may be inserted between the wavelength-variable laser 209 and the polarizing beam splitter 210. Accordingly, by rotating the λ/2 plate, the polarization plane of the laser light may be rotated to vary the intensity ratio between the signal light and the reference light.

Moreover, while the configuration of the interference light detecting unit 215 has been described using the configuration shown in FIG. 7 in the present embodiment, the present invention is not limited to this configuration. For example, the interference light detecting unit 215 may be configured as shown in FIG. 9.

Figure 9:
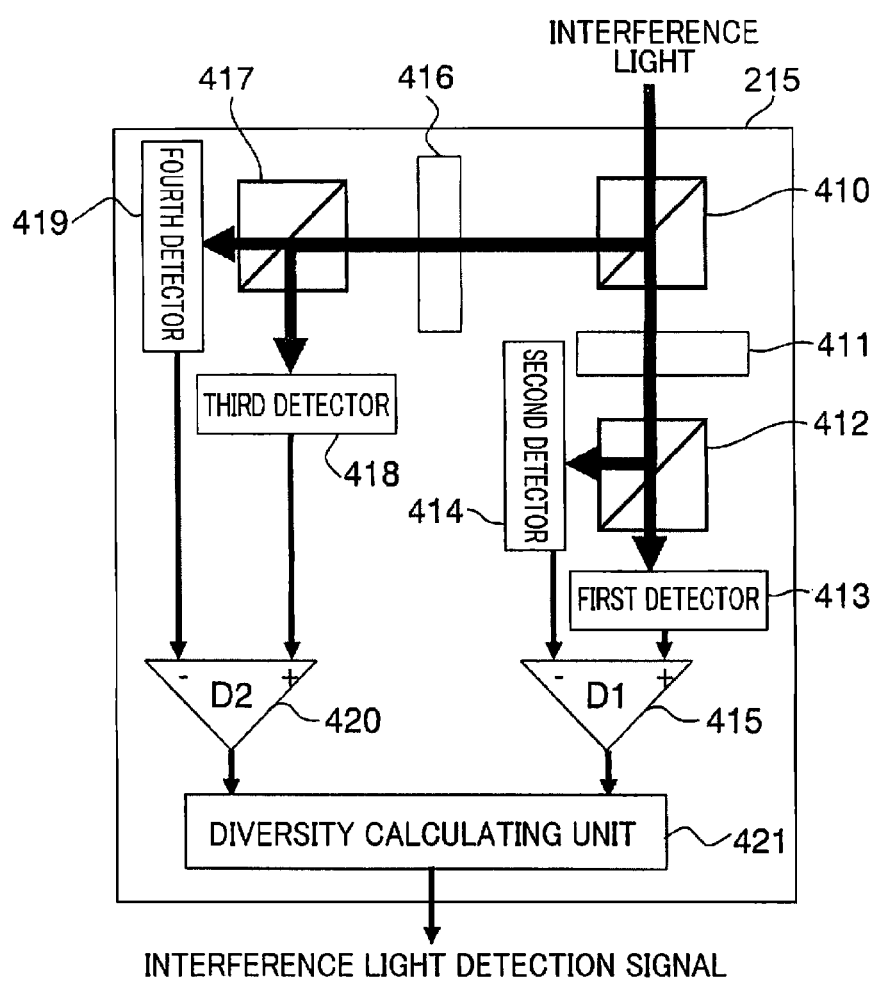
FIG. 9 is a diagram showing another example of a specific configuration of an interference light detecting unit according to the first embodiment.

FIG. 9 is a diagram showing another example of a specific configuration of the interference light detecting unit 215 according to the first embodiment. The interference light detecting unit 215 shown in FIG. 9, has a half beam splitter 410, a λ/2 plate 411, a first polarizing beam splitter 412, a first detector 413, a second detector 414, a first differential signal calculating unit 405, a λ/4 plate 416, a second polarizing beam splitter 417, a third detector 418, a fourth detector 419, a second differential signal calculating unit 420, and a diversity calculating unit 421.

The half beam splitter 410 reflects and transmits an incident interference light in two directions at approximately the same intensity.

The λ/2 plate 411 rotates a polarization direction of the interference light transmitted through the half beam splitter 410 by 45 degrees. Among the interference light whose polarization direction has been rotated by 45 degrees, the first polarizing beam splitter 412 transmits approximately 100% of horizontally-polarized light incident and reflects approximately 100% of perpendicularly-polarized light. The first detector 413 and the second detector 414 output an electrical signal corresponding to incident light amount. The first detector 413 detects horizontally polarized light of the interference light whose polarization direction has been rotated by 45 degrees, and outputs an electrical signal corresponding to the light amount. The second detector 414 detects perpendicularly-polarized light of the interference light whose polarization direction has been rotated by 45 degrees, and outputs an electrical signal corresponding to the light amount. The first differential signal calculating unit 405 outputs a differential signal between an electrical signal outputted from the first detector 413 and an electrical signal outputted from the second detector 414.

The λ/4 plate 416 rotates the polarization direction of the interference light reflected by the half beam splitter 410 by 45 degrees and provides a phase difference of π/2 (90 degrees) between respective signal light components and reference light components of the perpendicularly-polarized light and the horizontally-polarized light. Among the interference light transmitted through the λ/4 plate 416, the second polarizing beam splitter 417 transmits approximately 100% of the horizontally-polarized light incident and reflects approximately 100% of the perpendicularly-polarized light. The third detector 418 and the fourth detector 419 output an electrical signal corresponding to incident light amount. The third detector 418 detects horizontally polarized light of the interference light transmitted through the λ/4 plate 416, and outputs an electrical signal corresponding to the light amount. The fourth detector 419 detects perpendicularly-polarized light of the interference light transmitted through the λ/4 plate 416, and outputs an electrical signal corresponding to the light amount. The second differential signal calculating unit 420 outputs a differential signal between an electrical signal outputted from the third detector 418 and an electrical signal outputted from the fourth detector 419.

The diversity calculating unit 421 performs computation based on an electrical signal outputted from the first differential signal calculating unit 405 and an electrical signal outputted from the second differential signal calculating unit 420, and outputs an interference light detection signal.

Moreover, while the fluctuation component detecting unit 217 and the reproduction signal processing unit 219 use an LPF or an HPF in order to remove a camming component of the optical disk medium 201 in a lower frequency band than a frequency band of a signal component in the present embodiment, the present invention is not limited thereto. The fluctuation component detecting unit 217 and the reproduction signal processing unit 219 may remove unnecessary components by subjecting the interference light detection signal to a Fourier transform to convert a time domain signal into a frequency domain signal and dividing a band according to frequency domains.

In addition, while an optical path fluctuation factor in a lower frequency band than a signal component such as a camming component of the optical disk medium 201 has been described in the present embodiment as an example of a fluctuation factor due to disturbance, the fluctuation component detecting unit 217 and the reproduction signal processing unit 219 may remove a fluctuation factor of a higher frequency component than the signal component. The fluctuation component detecting unit 217 may use an HPF that cuts off frequencies higher than a signal band to remove unnecessary components. Furthermore, the reproduction signal processing unit 219 may use an LPF that cuts off frequencies higher than a signal band to remove unnecessary components.

In addition, while a camming component of the optical disk medium 201 has been described in the present embodiment as an example of a fluctuation factor due to disturbance, a fluctuation component due to a factor that causes a fluctuation in an optical path difference of a lower frequency band than a modulated signal such as a temperature variation can also be removed with a similar configuration.

Furthermore, while the signal processing unit 216 is arranged outside the optical head unit 206 in the present embodiment, a configuration may also be adopted in which the optical head unit 206 includes the signal processing unit 216.

In addition, in the present embodiment, a configuration may be adopted in which the signal processing unit 216 is integrated on a single LSI (Large Scale Integration).

Figure 10:
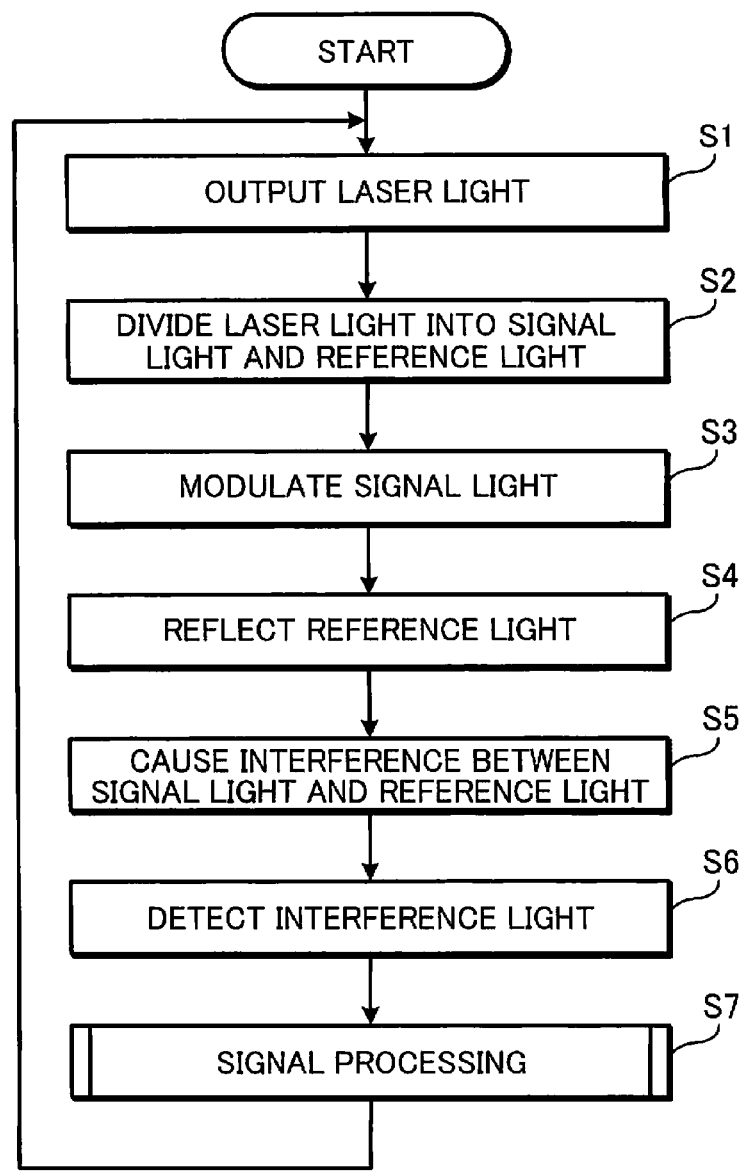
FIG. 10 is a flow chart showing an example of a modulated signal detecting method of the optical disk apparatus shown in FIG. 4.
Figure 11:
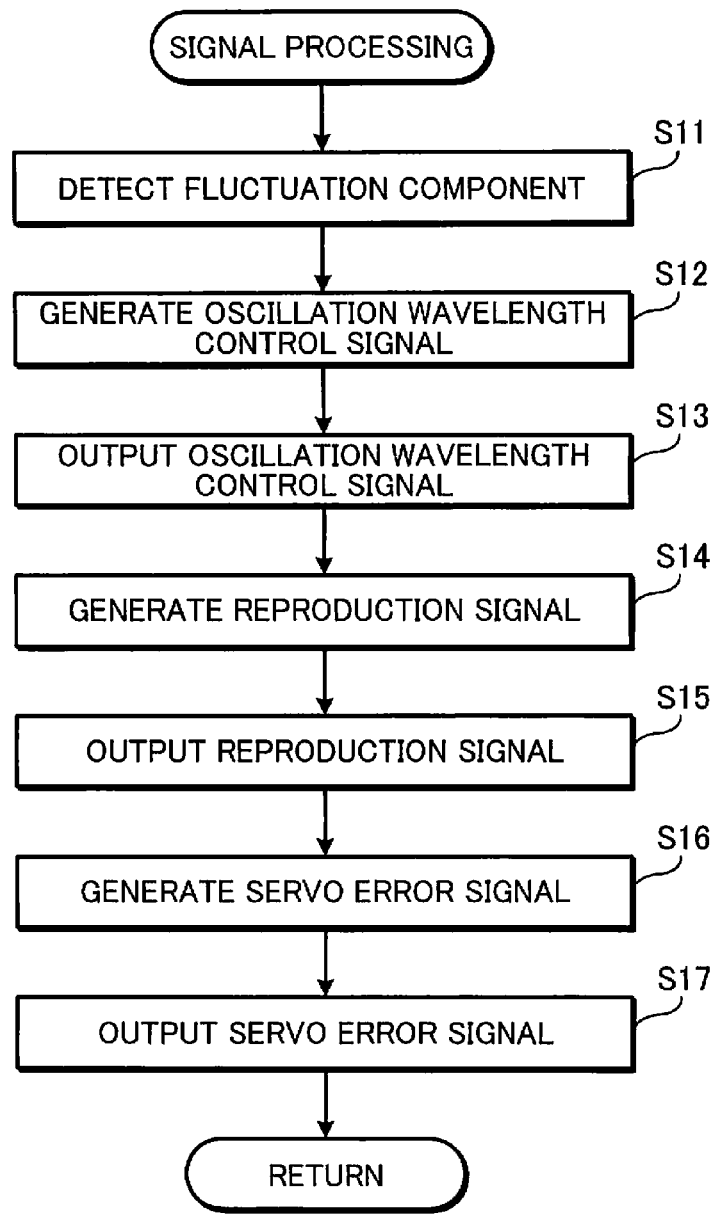
FIG. 11 is a flow chart showing an example of signal processing shown in FIG. 10.

Furthermore, in the present embodiment, functions of the signal processing unit 216 may be realized by a computer-executable program and a computer. FIG. 10 is a flow chart showing an example of a modulated signal detecting method to be performed by the optical disk apparatus shown in FIG. 4, and FIG. 11 is a flow chart showing an example of signal processing shown in FIG. 10. For example, a program of the signal processing unit 216 is represented by the flow chart shown in FIG. 11.

First, in step S1, the wavelength-variable laser 209 emits laser light. The laser light emitted from the wavelength-variable laser 209 is incident to the polarizing beam splitter 210.

In step S2, the polarizing beam splitter 210 splits the light emitted from the wavelength-variable laser 209 into signal light and reference light. The signal light is transmitted through the λ/4 plate 211 and then focused on the optical disk medium 201 by the objective lens 207. The reference light is transmitted through the λ/4 plate 212 and then incident to the reference light mirror 213.

In step S3, the optical disk medium 201 modulates the signal light. The signal light modulated by the optical disk medium 201 is transmitted through the objective lens 207 and the λ/4 plate 211 and then incident to the polarizing beam splitter 210.

Moreover, in a case where the modulated signal detecting apparatus is an optical disk apparatus, the signal light is modulated by the optical disk medium 201. In a case where the modulated signal detecting apparatus is an optical communication apparatus, the signal light is modulated by a signal light modulating unit (optical modulating element) that varies optical characteristics according to data to be transmitted. In a case where the modulated signal detecting apparatus is an object shape measuring apparatus, the signal light is modulated by an object having a predetermined surface shape.

In step S4, the reference light mirror 213 reflects the reference light. The reference light reflected by the reference light mirror 213 is transmitted through the λ/4 plate 212 and then incident to the polarizing beam splitter 210.

In step S5, the polarizing beam splitter 210 causes an interference between the signal light that has been modulated and the reference light that has been reflected by the reference light mirror 213. Interference light generated by the polarizing beam splitter 210 is incident to the interference light detecting unit 215.

In step S6, the interference light detecting unit 215 detects the interference light from the polarizing beam splitter 210 and outputs an interference light detection signal to the signal processing unit 216.

In step S7, the signal processing unit 216 performs predetermined signal processing on the interference light detection signal.

The signal processing performed in step S7 will now be described with reference to FIGS. 8 and 11.

In step S11, the fluctuation component detecting unit 217 acquires the interference light detection signal outputted from the interference light detecting unit 215 and detects a fluctuation component in a band other than a modulated signal band from the interference light detection signal.

In step S12, the wavelength control signal generating unit 218 generates an oscillation wavelength control signal for controlling an oscillation wavelength of the wavelength-variable laser 209 based on the fluctuation component detected by the fluctuation component detecting unit 217.

In step S13, the wavelength control signal generating unit 218 outputs the oscillation wavelength control signal to the wavelength-variable laser 209.

In step S14, the reproduction signal processing unit 219 acquires the interference light detection signal outputted from the interference light detecting unit 215, and generates a reproduction signal by extracting (detecting) a reproduction signal (modulated signal) from the interference light detection signal.

In step S15, the reproduction signal processing unit 219 outputs the reproduction signal.

In step S16, the control signal processing unit 220 acquires the interference light detection signal outputted from the interference light detecting unit 215, and generates a servo error signal corresponding to a focus position of the objective lens 207 from the interference light detection signal.

In step S17, the control signal processing unit 220 outputs the servo error signal to the servo circuit 205. The servo circuit 205 uses the servo error signal outputted by the control signal processing unit 220 to control the lens drive unit 208 so that a focus state and a scan state of an optical beam at the objective lens 207 become optimum.

Subsequently, returning to the process of step S1 shown in FIG. 10, the wavelength-variable laser 209 emits laser light corresponding to the oscillation wavelength control signal generated by the wavelength control signal generating unit 218.

Moreover, processes of steps S11 to S13, processes of steps S14 and S15, and processes of steps S16 and S17 are not limited to the sequences shown in FIG. 11.

Second Embodiment

Figure 12:
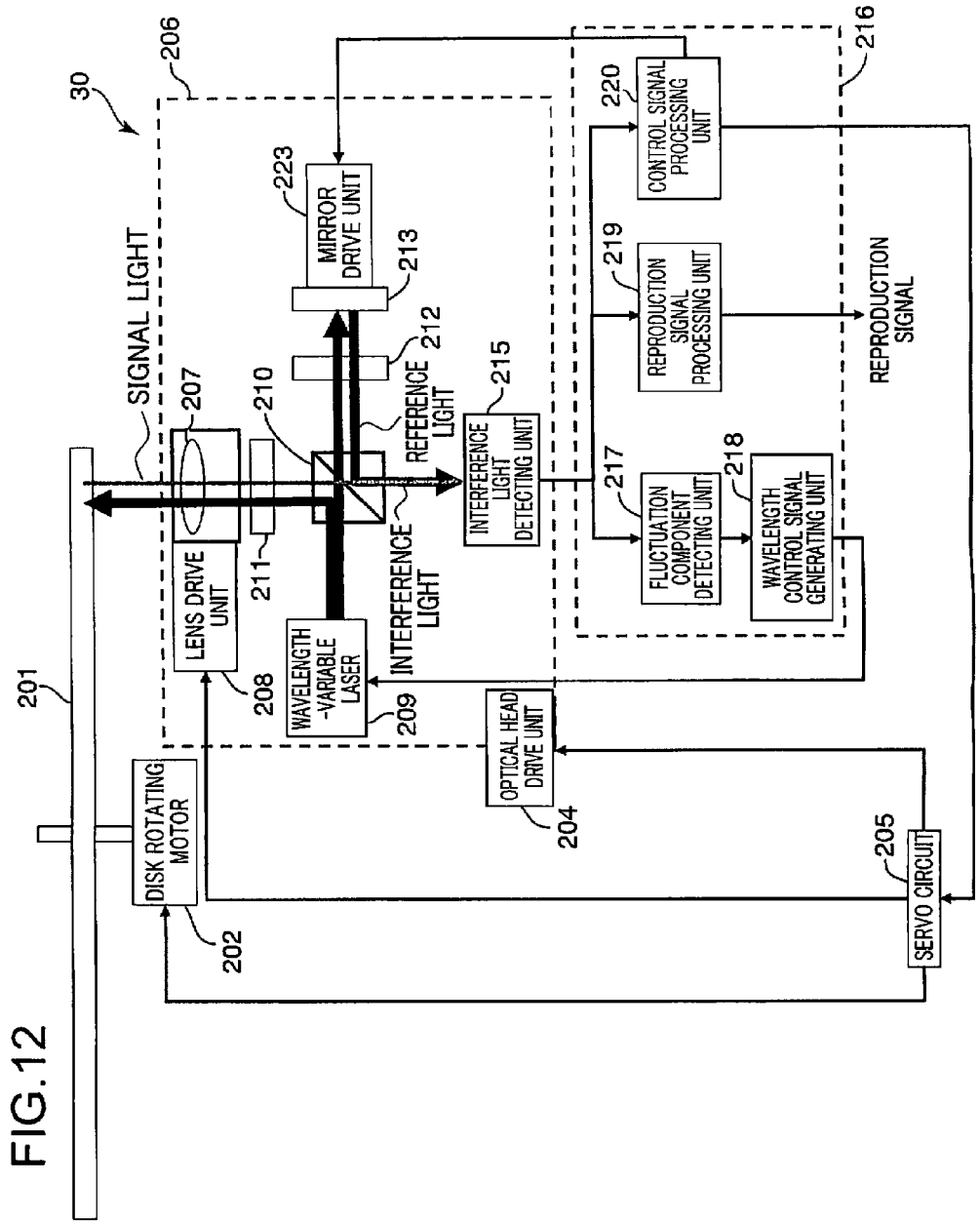
FIG. 12 is a diagram showing a configuration of an optical disk apparatus according to a second embodiment of the present invention.

FIG. 12 is a diagram showing a configuration of an optical disk apparatus according to a second embodiment of the present invention.

In FIG. 12, same components as those shown in FIGS. 4 and 8 are denoted by same reference numerals and descriptions thereof will be omitted.

In FIG. 12, using a clock signal generated from an optical disk medium 201 on which information is recorded, an optical disk apparatus 30 reproduces data from the optical disk medium 201 or records data onto the optical disk medium 201. The optical disk apparatus 30 comprises a disk rotating motor 202, an optical head drive unit 204, a servo circuit 205, an optical head unit 206, and a signal processing unit 216.

In FIG. 12, the optical head unit 206 has a wavelength-variable laser 209, a polarizing beam splitter 210, λ/4 plates 211 and 212, a reference light mirror 213, an objective lens 207, a lens drive unit 208, an interference light detecting unit 215, and a mirror drive unit 223.

In FIG. 12, the mirror drive unit 223 varies a position of the reference light mirror 213. By varying the position of the reference light mirror 213, an initial optical path length $lm_0$ of reference light can be varied. The mirror drive unit 223 is controlled by a control signal outputted from the control signal processing unit 220. The mirror drive unit 223 varies an initial optical path difference $|ld_0 - lm_0|$ by moving the position of the reference light mirror 213.

For example, the reference light mirror 213 may be driven according to a temperature condition table set in advance in the control signal processing unit 220 or the like to a position corresponding to a current temperature inside the optical disk apparatus 30 and/or a current temperature of the wavelength-variable laser 209. At this point, the optical disk medium 201 may or may not be mounted in the optical disk apparatus 30.

In addition, when the optical disk medium 201 is mounted in the optical disk apparatus 30, laser light is irradiated on the optical disk medium 201 while the position of the reference light mirror 213 is varied by the mirror drive unit 223. Furthermore, the control signal processing unit 220 may use an interference light detection signal detected by the interference light detecting unit 215 or a signal detected by all of or a part of the detectors in the interference light detecting unit 215 in order to perform control so that the reference light mirror 213 moves to a position where an S/N of the interference light detection signal becomes approximately maximum.

At this point, the optical disk medium 201 may be rotating or may be stationary. In addition, while a irradiating position of the laser light to the optical disk medium 201 is not particularly limited, the laser light may be irradiated to a particular region that becomes a reference for mirror adjustment or a particular region in which recorded information is not destroyed. Furthermore, the positional control of the reference light mirror 213 described above may be performed in a part of or all of a series of operations for reproducing information from the optical disk medium 201 and in a part of or all of a series of operations for recording information onto the optical disk medium 201. The term "series of operations" as used herein refers to operations which are performed before or after recording or reproduction of information and which include an operation for irradiating ser light on the optical disk medium 201 to determine a type or the like of the optical disk medium 201, a focusing operation for collecting laser light on an information recording layer of the optical disk medium 201 to perform focusing, a tracking operation for tracking an information recording track of the information recording layer of the optical disk medium 201, and a seek operation for accessing a predetermined information recording region of the information recording layer of the optical disk medium 201.

Accordingly, the reference light mirror 213 can now be arranged so as to constantly satisfy Expression (6) while accommodating a variation in the initial optical path length $ld_0$ of the signal light caused by interchanging between optical disk media of a same standard but different types (for example, replacing a Blu-ray Disc-A with a Blu-ray Disc-B) or interchanging between optical disk media of different standards (for example, replacing a Blu-ray Disc with a DVD), or a variation in the central oscillation wavelength $\lambda_0$ caused by switching to a different laser or a temperature variation inside the apparatus.

Moreover, in the present embodiment, the optical disk apparatus 30 corresponds to an example of the modulated signal detecting apparatus and the mirror drive unit 223 corresponds to an example of the reference light mirror drive unit.

Since operations of the optical disk apparatus 30 according to the second embodiment are the same as the operations of the optical disk apparatus 20 according to the first embodiment, a description thereof will be omitted.

Third Embodiment

Figure 13:
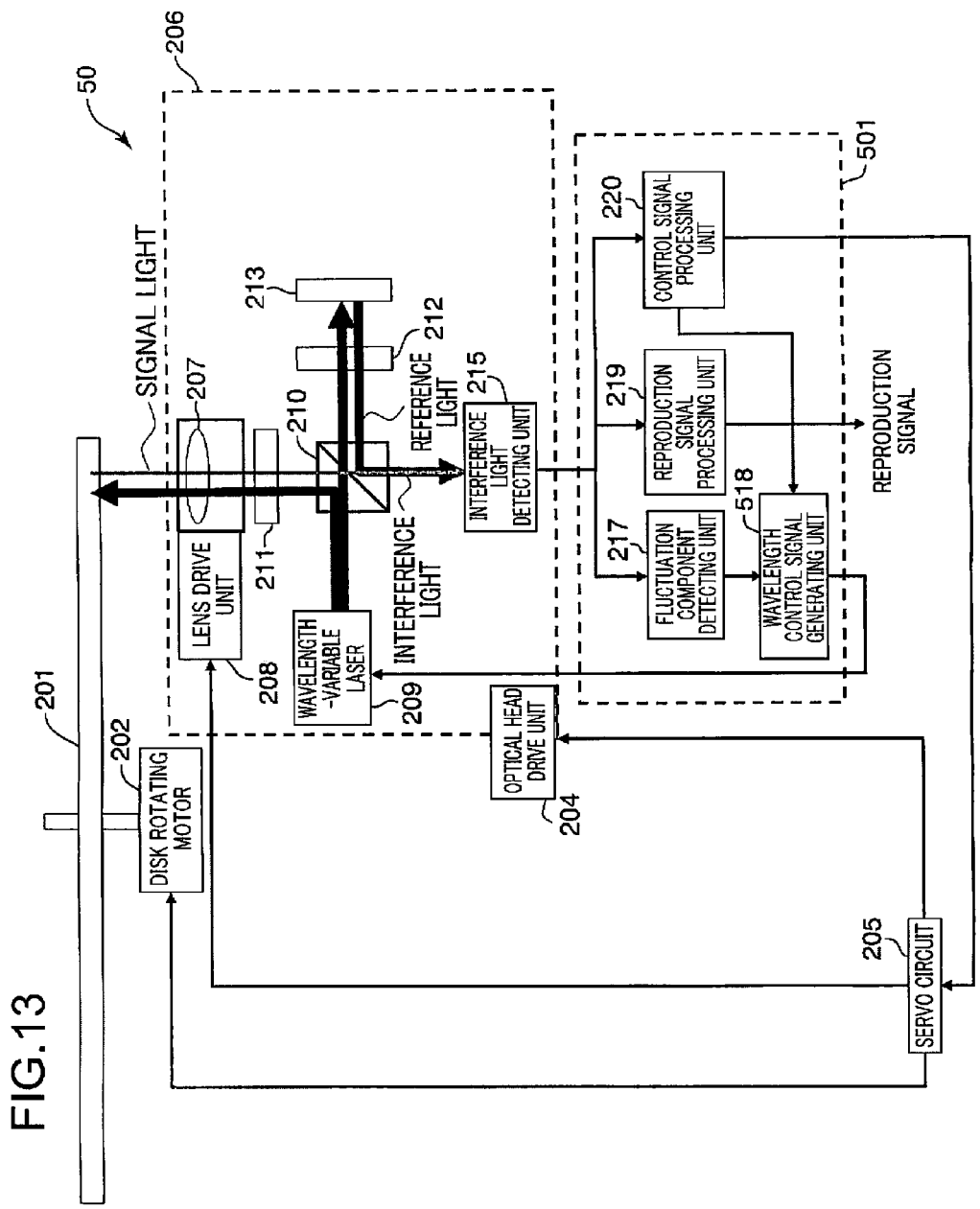
FIG. 13 is a diagram showing a configuration of an optical disk apparatus according to a third embodiment of the present invention.

FIG. 13 is a diagram showing a configuration of an optical disk apparatus according to a third embodiment of the present invention.

In FIG. 13, same components as those shown in FIGS. 4 and 8 are denoted by same reference numerals and descriptions thereof will be omitted.

In FIG. 13, using a clock signal generated from an optical disk medium 201 on which information is recorded, an optical disk apparatus 50 reproduces data from the optical disk medium 201 or records data onto the optical disk medium 201. The optical disk apparatus 50 comprises a disk rotating motor 202, an optical head drive unit 204, a servo circuit 205, an optical head unit 206, and a signal processing unit 501.

The signal processing unit 501 shown in FIG. 13 has a fluctuation component detecting unit 217, a reproduction signal processing unit 219, a control signal processing unit 220, and a wavelength control signal generating unit 518.

In FIG. 13, the wavelength control signal generating unit 518 generates an oscillation wavelength control signal based on a servo error signal which is outputted from the control signal processing unit 220 and which is used for focus control or tracking control and phase error information separated from an interference light detection signal detected by the interference light detecting unit 215. The phase error information outputted by the fluctuation component detecting unit 217 is generated from the interference light detection signal from the interference light detecting unit 215. Therefore, a detection range of an optical phase becomes approximately ½ of the wavelength of light and a dynamic range of detection becomes narrow. As a result, there is a problem that control becomes unstable when optical path fluctuation is large.

A feature of the present third embodiment is that positional information of the objective lens 207 from the control signal processing unit 220 that is used to control movement of the objective lens 207 is also used for wavelength control of the wavelength-variable laser. A servo error signal includes a focus error signal that is used for focus control of the optical disk medium 201, and the focus error signal corresponds to a drive distance of the objective lens 207. The drive distance of the objective lens 207 corresponds to a camming fluctuation of the optical disk medium 201. Therefore, an optical path fluctuation of signal light can now be calculated from a focus error signal and a more stable oscillation wavelength control signal for the wavelength-variable laser 209 can be generated.

The control signal processing unit 220 generates a servo error signal corresponding to the focus position of the objective lens 207 from the interference light detection signal. The wavelength control signal generating unit 518 generates an oscillation wavelength control signal based on the servo error signal (focus error signal) generated by the control signal processing unit 220.

Moreover, in the present embodiment, the optical disk apparatus 50 corresponds to an example of the modulated signal detecting apparatus, the objective lens 207 corresponds to an example of the objective lens, the control signal processing unit 220 corresponds to an example of the servo error signal generating unit, and the wavelength control signal generating unit 518 corresponds to an example of the wavelength control signal generating unit.

In addition, since operations of the optical disk apparatus 50 according to the third embodiment are the same as operations of the optical disk apparatus 20 according to the first embodiment, a description thereof will be omitted.

Fourth Embodiment

Figure 14:
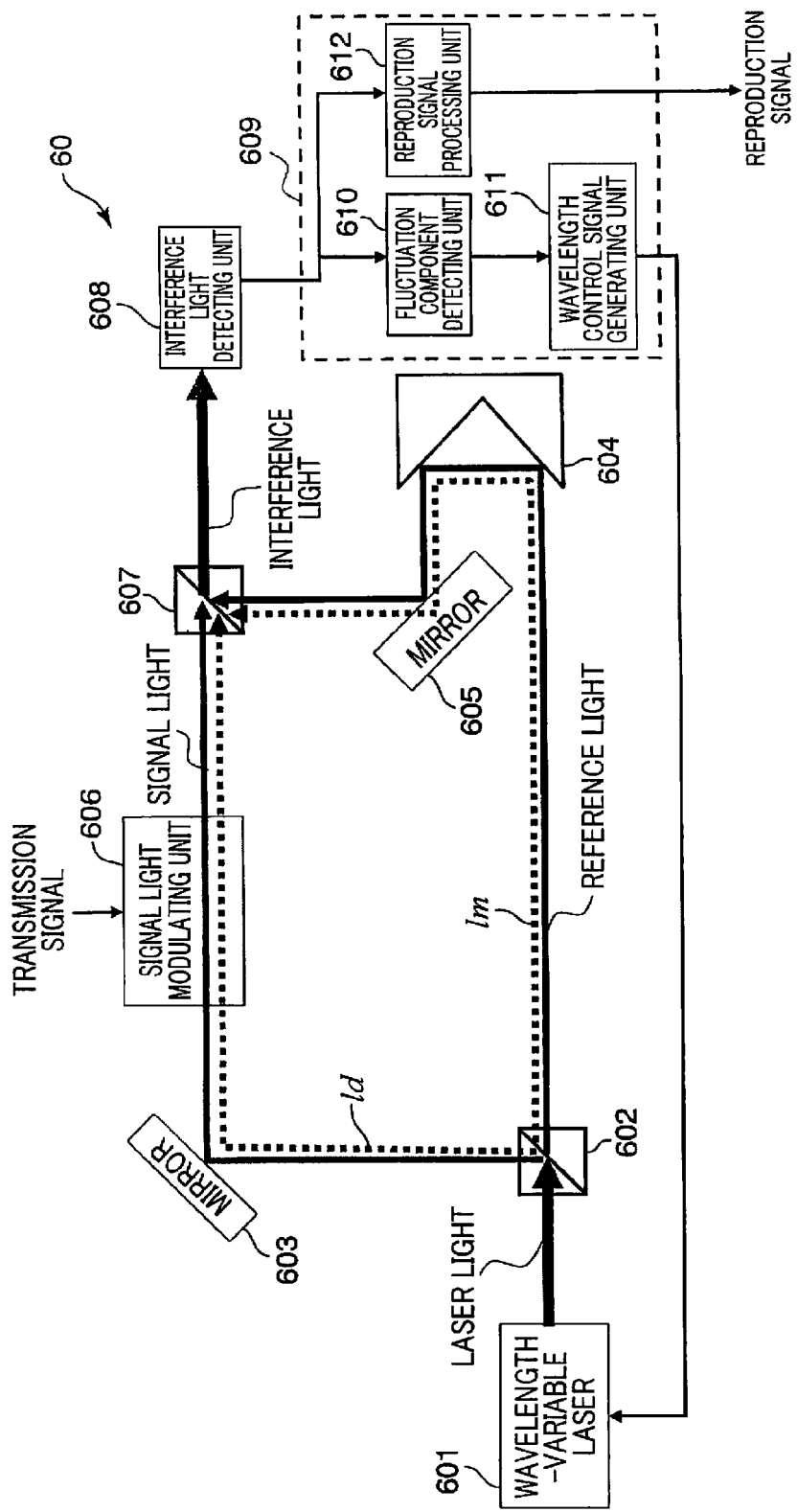
FIG. 14 is a diagram showing a configuration of an optical communication apparatus according to a fourth embodiment of the present invention.

FIG. 14 is a diagram showing a configuration of an optical communication apparatus according to a fourth embodiment of the present invention.

In FIG. 14, an optical communication apparatus 60 transmits data by modulating an intensity or a phase of light depending on the data to be transmitted (transmission signal). The optical communication apparatus 60 comprises a wavelength-variable laser 601, an optical dividing unit 602, mirrors 603 and 605, a reference light mirror 604, a signal light modulating unit 606, an interference unit 607, an interference light detecting unit 608, and a signal processing unit 609.

The wavelength-variable laser 601 emits laser light. If $\lambda_0$ denotes a central oscillation wavelength and $\Delta\lambda$ denotes an oscillation wavelength variable range in which oscillation can be performed at an arbitrary intensity or higher, then the wavelength-variable laser 601 is capable of varying oscillation wavelengths within a range expressed as $\lambda_0 \pm (\Delta\lambda/2)$ due to an oscillation wavelength control signal.

The optical dividing unit 602 and the interference unit 607 are both constituted by polarizing beam splitters. When light is incident to a separation plane of a polarizing beam splitter, approximately 100% of horizontally-polarized light is transmitted and approximately 100% of perpendicularly-polarized light is reflected. The optical dividing unit 602 divides laser light emitted from the wavelength-variable laser 601 into a perpendicularly-polarized signal light and a horizontally-polarized reference light. In addition, the divided signal light is reflected by and transmitted through the mirror 603 and the signal light modulating unit 606 on an optical path and reaches the interference unit 607. The divided reference light is reflected by the reference light mirror 604 and the mirror 605 on an optical path and reaches the interference unit 607. The interference unit 607 is constituted by a polarizing beam splitter whose reflecting direction and transmitting direction are opposite to those of the optical dividing unit 602. Accordingly, the interference unit 607 transmits approximately 100% of perpendicularly-polarized signal light and reflects approximately 100% of horizontally-polarized reference light, and outputs interference light obtained by an interference between the signal light and the reference light.

In this case, the polarization plane of the laser light incident to the optical dividing unit 602 is capable of varying an intensity ratio between the signal light and the reference light by arranging the wavelength-variable laser 601 that has been rotated in advance.

The signal light modulating unit 606 is arranged on the optical path of the signal light and varies optical characteristics according to data to be transmitted. The signal light modulating unit 606 varies (modulates) the intensity or the phase of the signal light according to the transmission signal. For example, when phase modulation is performed, the signal light modulating unit 606 uses an element that is capable of varying a refractive index according to a level of an applied electrical signal (transmission signal). When intensity modulation is performed, the signal light modulating unit 606 uses an element that is capable of varying transmittance according to a level of an applied electrical signal (transmission signal).

The reference light mirror 604 reflects approximately 100% of the reference light divided from the laser light and guides the reference light in the direction of the mirror 605.

An arrangement of the reference light mirror 604 will now be described. An initial optical path length that is a length of an optical path along which signal light travels as converted using a refractive index in vacuum is expressed by $ld_0$, and an initial optical path length that is a length of an optical path along which reference light travels as converted using a refractive index in vacuum is expressed by $lm_0$. In other words, the initial optical path length $ld_0$ and the initial optical path length $lm_0$ are both optical path lengths as converted using a refractive index in vacuum n (n=1). In this case, a difference in initial optical path lengths is expressed by $|ld_0 - lm_0|$. Based on a relationship among a central oscillation wavelength $\lambda_0$ of the wavelength-variable laser 601, an oscillation wavelength variable range $\Delta\lambda$ of the wavelength-variable laser 601, and the fluctuation width $\Delta l$ of a difference in optical path lengths between the signal light and the reference light as converted using the refractive index in vacuum n (n=1) which occurs due to a variation in refractive index of the signal light modulating unit 606 caused by a noise component included in a transmission signal or a temperature variation of the apparatus, the reference light mirror 213 is arranged so that the initial optical path length $lm_0$ satisfies Expression (6) above. In this case, the initial optical path length $ld_0$ is calculated using a center value of a fluctuation in optical path length. In other words, an optical path length that is the optical path length of the signal light as converted using a refractive index in vacuum n (n=1) varies within a range expressed as $ld_0 \pm (\Delta l/2)$.

The interference light detecting unit 608 detects interference light resulting from the interference between the signal light modulated by the transmission signal and the reference light, converts the detected interference light into an electrical signal, and outputs the electrical signal as an interference light detection signal. The interference light detecting unit 608 shares a same configuration as, for example, the interference light detecting unit 215 shown in FIG. 7. A description of FIG. 7 is similar to that provided in the first embodiment.

The signal processing unit 609 has a fluctuation component detecting unit 610, a wavelength control signal generating unit 611, and a reproduction signal processing unit 612.

The fluctuation component detecting unit 610 detects a fluctuation component created by an optical path fluctuation due to a disturbance such as heat and noise from the interference light detection signal outputted by the interference light detecting unit 608, and generates and outputs a fluctuation component signal representing the detected fluctuation component. At this point, if the signal modulation by the signal light modulating unit 606 is phase modulation, a signal component ends up being included in the fluctuation component. For example, a vacuum-converted optical path fluctuation noise, which is an optical path fluctuation noise caused by a temperature variation of the apparatus that is one of the factors that create a fluctuation component as converted using a refractive index in vacuum, has a low frequency comparable to a variation over time in temperature compared to a frequency band of a reproduction signal. In consideration thereof, the fluctuation component detecting unit 610 is capable of extracting only a fluctuation component due to a temperature variation by using an LPF (low-pass filter).

Moreover, when signal modulation by the signal light modulating unit 606 is intensity modulation, the fluctuation component detecting unit 610 may generate a fluctuation component signal that represents a fluctuation noise component for all frequency bands that can be accommodated by a wavelength-varying response speed of the wavelength-variable laser 601.

The wavelength control signal generating unit 611 generates an oscillation wavelength control signal for controlling an oscillation wavelength of the wavelength-variable laser 601 based on the fluctuation component signal outputted from the fluctuation component detecting unit 610.

The reproduction signal processing unit 612 removes a fluctuation component from the interference light detection signal outputted by the interference light detecting unit 608, and generates and outputs a reproduction signal. For example, by using an HPF (high-pass filter) on a vacuum-converted optical path fluctuation noise, which is an optical path fluctuation noise caused by a temperature variation of the apparatus that is one of the factors that create a fluctuation component as converted using a refractive index in vacuum, the reproduction signal processing unit 612 can suppress the fluctuation component and retrieve a reproduction signal with a favorable S/N.

According to this configuration, due to an initial optical path difference between signal light and reference light satisfying Expression (6) above and an oscillation wavelength being controlled within an oscillation wavelength variable range of the wavelength-variable laser 601, fluctuation noise components other than a modulated signal can be canceled out.

Moreover, in the present embodiment, the optical communication apparatus 60 corresponds to an example of the modulated signal detecting apparatus, the wavelength-variable laser 601 corresponds to an example of the wavelength-variable laser, the optical dividing unit 602 corresponds to an example of the optical divider, the reference light mirror 604 corresponds to an example of the reference light mirror, the signal light modulating unit 606 corresponds to an example of the optical modulating element, the interference unit 607 corresponds to an example of the interference unit, the interference light detecting unit 608 corresponds to an example of the interference light detecting unit, the fluctuation component detecting unit 610 and the wavelength control signal generating unit 611 correspond to an example of the wavelength control signal generating unit, and the reproduction signal processing unit 612 corresponds to an example of the reproduction signal processing unit.

While a position of the reference light mirror 604 in a direction of an optical axis is adjusted so that the initial optical path length $lm_0$ of the reference light satisfies Expression (6) in the present embodiment, the present invention is not limited thereto. Only the initial optical path length $ld_0$ of the signal light or both the initial optical path length $lm_0$ of the reference light and the initial optical path length $ld_0$ of the signal light may be varied so as to satisfy Expression (6). For example, the initial optical path length $ld_0$ of the signal light may be adjusted so as to satisfy Expression (6) by arranging a bypass or an element with a high refractive index on the optical path of the signal light and increasing the optical path length as converted by a refractive index in vacuum.

Furthermore, while the polarization plane of the laser light incident to the optical dividing unit 602 is adapted so as to be capable of varying an intensity ratio between the signal light and the reference light by arranging the wavelength-variable laser 601 that has been rotated in advance in a plane perpendicular to the optical axis, the present invention is not limited thereto. For example, a λ/2 plate may be inserted between the wavelength-variable laser 601 and the optical dividing unit 602. By rotating the λ/2 plate, the polarization plane of the laser light may be rotated to vary the intensity ratio between the signal light and the reference light.

Moreover, while the configuration of the interference light detecting unit 608 has been described as being the same as that of the interference light detecting unit 215 shown in FIG. 7 in the present embodiment, the present invention is not limited to this configuration. For example, the interference light detecting unit 608 may be configured as shown in FIG. 9.

In addition, while the fluctuation component detecting unit 610 and the reproduction signal processing unit 612 use an LPF or an HPF in order to remove a vacuum-converted optical path fluctuation component that is an optical path fluctuation component caused by a temperature variation in a lower frequency band than a frequency band of a signal component as converted using a refractive index in vacuum in the present embodiment, the present invention is not limited thereto. The fluctuation component detecting unit 610 and the reproduction signal processing unit 612 may remove unnecessary components by subjecting the interference light detection signal to a Fourier transform to convert a time domain signal into a frequency domain signal and dividing a band according to frequency domains.

Furthermore, while an optical path fluctuation factor in a lower frequency band than a signal component such as a vacuum-converted optical path fluctuation component that is an optical path fluctuation component caused by a temperature variation as converted using a refractive index in vacuum has been described in the present embodiment as an example of a fluctuation factor due to disturbance, the fluctuation component detecting unit 610 and the reproduction signal processing unit 612 may remove a fluctuation factor of a higher frequency component than the signal component. In this case, the fluctuation component detecting unit 610 may use an HPF that cuts off frequencies higher than a signal band to remove unnecessary components. In addition, the reproduction signal processing unit 612 may use an LPF that cuts off frequencies higher than a signal band to remove unnecessary components.

Furthermore, while the fluctuation component detecting unit 610 detects a fluctuation noise component using an LPF and the reproduction signal processing unit 612 removes frequencies that are lower than a modulated signal band using an HPF in the present embodiment, the present invention is not limited thereto. The fluctuation component detecting unit 610 may detect a fluctuation noise component using a BEF (band-elimination filter) instead of an LPF and the reproduction signal processing unit 612 may remove a fluctuation noise component outside the signal band using a BPF (band-pass filter) instead of an HPF.

In addition, while the optical dividing unit 602 and the interference unit 607 are constituted by polarizing beam splitters in the present embodiment, the present invention is not limited thereto.

For example, the optical dividing unit 602 and the interference unit 607 may both be beam splitters having a ratio between reflectance and transmittance of 1:1. In this case, light incident to a separation plane of a half beam splitter is divided into signal light and reference light having an intensity ratio of 1:1. In addition, the divided signal light is reflected by the mirror 603 on an optical path and transmitted through the signal light modulating unit 606 on the optical path, and reaches the interference unit 607. The divided reference light is reflected by the reference light mirror 604 on an optical path and reflected by the mirror 605 on the optical path, and reaches the interference unit 607. The interference unit 607 outputs interference light obtained by the interference between the signal light and the reference light.

Furthermore, in the present embodiment, a configuration may be adopted in which the signal processing unit 609 is integrated on a single LSI.

Moreover, in the present embodiment, functions of the signal processing unit 609 may be realized by a computer-executable program and a computer. For example, a program of the signal processing unit 609 is represented by the flow chart shown in FIG. 11.

Fifth Embodiment

Figure 15:
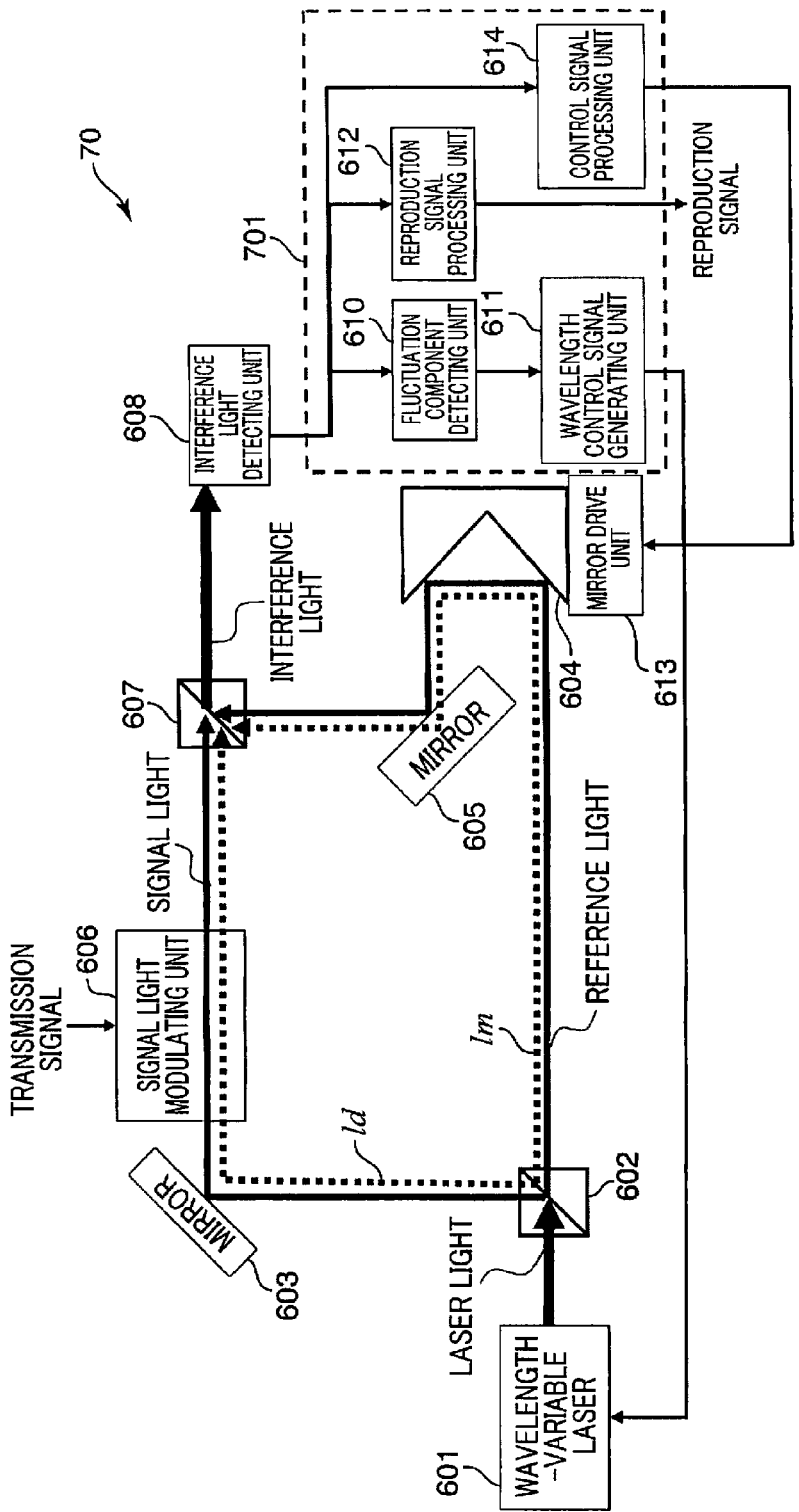
FIG. 15 is a diagram showing a configuration of an optical communication apparatus according to a fifth embodiment of the present invention.

FIG. 15 is a diagram showing a configuration of an optical communication apparatus according to a fifth embodiment of the present invention.

In FIG. 15, same components as those shown in FIG. 14 are denoted by same reference numerals and descriptions thereof will be omitted.

In FIG. 15, an optical communication apparatus 70 transmits data by modulating an intensity or a phase of light depending on the data to be transmitted (transmission signal). The optical communication apparatus 70 comprises a wavelength-variable laser 601, an optical dividing unit 602, mirrors 603 and 605, a reference light mirror 604, a signal light modulating unit 606, an interference unit 607, an interference light detecting unit 608, a mirror drive unit 613, and a signal processing unit 701.

The signal processing unit 701 has a fluctuation component detecting unit 610, a wavelength control signal generating unit 611, a reproduction signal processing unit 612, and a control signal processing unit 614.

The control signal processing unit 614 generates a mirror drive signal based on an interference light detection signal obtained from the interference light detecting unit 608 and outputs the mirror drive signal to the mirror drive unit 613. The mirror drive unit 613 is controlled by the mirror drive signal outputted from the control signal processing unit 614.

In FIG. 15, the mirror drive unit 613 varies a position of the reference light mirror 604. By varying the position of the reference light mirror 604, an initial optical path length $lm_0$ of reference light can be varied. Accordingly, the reference light mirror 604 can be arranged so as to always satisfy Expression (6) while accommodating a variation in an initial optical path length $ld_0$ of signal light, a variation in a central oscillation wavelength $\lambda_0$ due to replacement with a different laser or a temperature variation in the apparatus, or the like.

Moreover, in the present embodiment, the optical communication apparatus 70 corresponds to an example of the modulated signal detecting apparatus and the mirror drive unit 613 corresponds to an example of the reference light mirror drive unit.

In addition, since operations of the optical communication apparatus 70 according to the fifth embodiment are the same as operations of the optical communication apparatus 60 according to the fourth embodiment, a description thereof will be omitted. Furthermore, since a process for moving the reference light mirror 604 is the same as the process for moving the reference light mirror 213 according to the second embodiment, a description thereof will be omitted.

Sixth Embodiment

Figure 16:
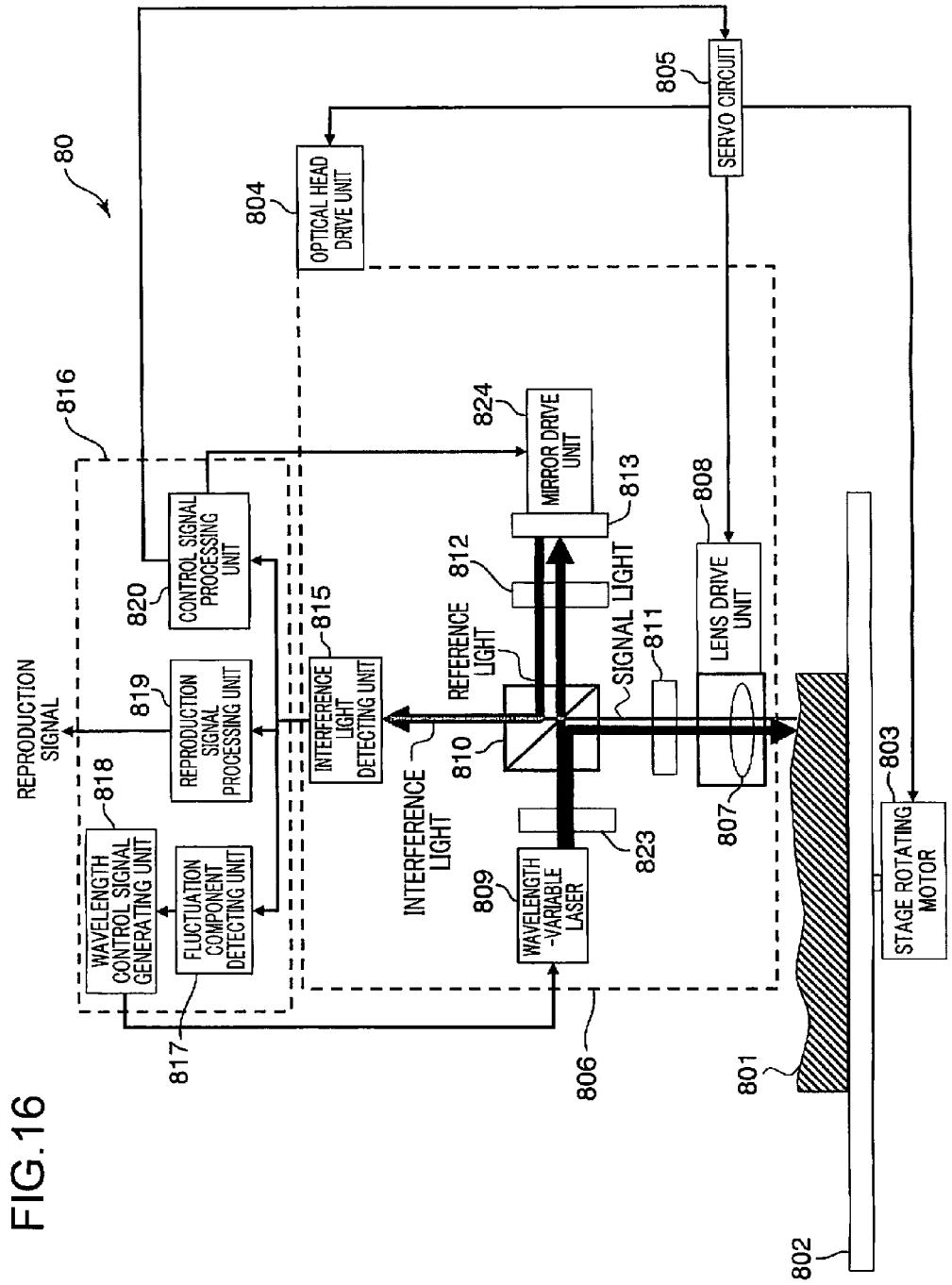
FIG. 16 is a diagram showing a configuration of an object shape measuring apparatus according to a sixth embodiment of the present invention.

FIG. 16 is a diagram showing a configuration of an object shape measuring apparatus according to a sixth embodiment of the present invention.

In FIG. 16, an object shape measuring apparatus 80 irradiates laser light on a shape measurement object 801 and measures a shape of the shape measurement object 801 by detecting a reflected light from the shape measurement object 801. The object shape measuring apparatus 80 comprises a stage 802, a stage rotating motor 803, an optical head drive unit 804, a servo circuit 805, an optical head unit 806, and a signal processing unit 816.

The shape measurement object 801 is an object which is arranged on an optical path of signal light and which has a predetermined surface shape. The stage rotating motor 803 rotates the stage 802 on which the shape measurement object 801 has been placed at a specified number of revolutions.

The optical head unit 806 has a wavelength-variable laser 809, a polarizing beam splitter 810, λ/4 plates 811 and 812, a reference light mirror 813, an objective lens 807, a lens drive unit 808, an interference light detecting unit 815, a λ/2 plate 823, and a mirror drive unit 824. The optical head unit 806 irradiates an optical beam to the shape measurement object 801, detects interference light resulting from an interference between the signal light reflected by the shape measurement object 801 and reference light, and outputs an electrical signal.

The wavelength-variable laser 809 emits laser light. If $\lambda_0$ denotes a central oscillation wavelength and $\Delta\lambda$ denotes an oscillation wavelength variable range in which oscillation can be performed at an arbitrary intensity or higher, then the wavelength-variable laser 809 is capable of varying oscillation wavelengths within a range expressed as $\lambda_0 \pm (\Delta\lambda/2)$ due to an oscillation wavelength control signal.

The polarizing beam splitter 810 transmits approximately 100% of horizontally-polarized light and reflects approximately 100% of perpendicularly-polarized light which are incident to a separation plane. The polarizing beam splitter 810 divides laser light emitted from the wavelength-variable laser 809 into a perpendicularly-polarized signal light and a horizontally-polarized reference light. In addition, polarization directions of the divided signal light and reference light are rotated by 90 degrees due to the signal light and the reference light twice passing through the λ/4 plates 811 and 812 positioned on respective optical paths thereof, and the signal light and the reference light return to the polarizing beam splitter 810. At this point, since the polarization directions of the signal light and the reference light have respectively been rotated by 90 degrees, contrary to during division, the polarizing beam splitter 810 transmits approximately 100% of the signal light that has become horizontally polarized light and reflects approximately 100% of the reference light that has become perpendicularly-polarized light. Accordingly, light from the polarizing beam splitter 810 becomes interference light between the signal light and the reference light having polarization planes that are perpendicular to each other.

In this case, the polarization plane of the laser light incident to the polarizing beam splitter 810 is capable of varying an intensity ratio between the signal light and the reference light by arranging the wavelength-variable laser 809 that has been rotated in advance.

The objective lens 807 focuses the signal light onto the shape measurement object 801 and converts the signal light reflected by the shape measurement object 801 into a parallel light. The signal light converted into a parallel light retraces the optical path of the signal light during its approach. In addition, the objective lens 807 is driven in a focusing direction by the lens drive unit 808.

Through transmission, the λ/4 plates 811 and 812 convert a linearly-polarized light into a circularly-polarized light and a circularly-polarized light into a linearly-polarized light. By being transmitted through the λ/4 plates 811 and 812 twice, a linearly-polarized light becomes a linearly-polarized light having a polarization plane rotated by 90 degrees. For example, perpendicularly-polarized light is converted into horizontally polarized light and horizontally polarized light is converted into perpendicularly-polarized light.

The reference light mirror 813 is arranged on the optical path of the reference light and reflects approximately 100% of the reference light divided from the laser light. The reference light reflected by the reference light mirror 813 returns along a same optical path as during its approach.

An arrangement of the reference light mirror 813 will now be described. If an initial optical path length that is a length of an optical path along which signal light travels as converted using a refractive index in vacuum is expressed by $ld_0$ and an initial optical path length that is a length of an optical path along which reference light travels as converted using a refractive index in vacuum is expressed by $lm_0$, then a difference in initial optical path lengths is expressed by $|ld_0-lm_0|$. Based on a relationship among the central oscillation wavelength $\lambda_0$ of the wavelength-variable laser 809, the oscillation wavelength variable range $\Delta\lambda$ of the wavelength-variable laser 809, and the fluctuation width $\Delta l$ of the difference in optical path lengths between the signal light and the reference light as converted using the refractive index in vacuum which is caused by a camming fluctuation of the stage 802 due to a rotational vibration or a vibration of the optical head unit 806 besides irregularities of the shape measurement object 801, the reference light mirror 813 is arranged so that the initial optical path length $lm_0$ satisfies Expression (6) above. At this point, the initial optical path length $ld_0$ is calculated using a center value of a fluctuation in optical path length that occurs due to a camming fluctuation of the stage 802 caused by a rotational vibration or a vibration of the optical head unit 806. In other words, an optical path length that is the optical path length of the signal light as converted using a refractive index in vacuum n (n=1) varies within a range expressed as $ld_0\pm(\Delta l/2)$.

The interference light detecting unit 815 detects interference light resulting from an interference between the signal light reflected by the shape measurement object 801 and the reference light, converts the detected interference light into an electrical signal, and outputs the electrical signal as an interference light detection signal. The interference light detecting unit 815 shares a same configuration as, for example, the interference light detecting unit 215 shown in FIG. 7. A description of FIG. 7 is similar to that provided in the first embodiment.

The mirror drive unit 824 varies a position of the reference light mirror 813. By varying the position of the reference light mirror 813, an initial optical path length $lm_0$ of reference light can be varied. Accordingly, the reference light mirror 813 can be arranged so as to always satisfy Expression (6) while accommodating a variation in an initial optical path length $ld_0$ of signal light or a variation in a fluctuation width $\Delta l$ of a difference in optical path lengths caused by a replacement with a shape measurement object 801 of a different shape, a variation in a central oscillation wavelength $\lambda_0$ due to replacement with a different laser or a temperature variation in the apparatus, or the like.

The servo circuit 805 uses a servo error signal to control the lens drive unit 808 so that a focus state of an optical beam by the objective lens 807 becomes optimum. In addition, the servo circuit 805 controls the optical head drive unit 804 so that a position where an optical beam is irradiated moves to an optimal radius position from a center of the stage 802. Furthermore, the servo circuit 805 optimally controls the number of revolutions of the stage rotating motor 803.

The signal processing unit 816 has a fluctuation component detecting unit 817, a wavelength control signal generating unit 818, a reproduction signal processing unit 819, and a control signal processing unit 820.

The fluctuation component detecting unit 817 detects a fluctuation component created by an optical path fluctuation due to a vibration of the stage 802 or the optical head unit 806 from the interference light detection signal outputted by the interference light detecting unit 815, and generates and outputs a fluctuation component signal representing the detected fluctuation component. In this case, for example, a noise due to camming of the stage 802 that is one of the factors that create a fluctuation component has a similar frequency to a band of rotation of the stage 802. In consideration thereof, the fluctuation component detecting unit 817 is capable of extracting only a fluctuation component due to camming of the stage 802 by using a BPF (band-pass filter). In addition, a configuration is adopted which enables a cut-off frequency of the BPF to be varied according to a shape of the shape measurement object 801, a speed of revolution of the stage rotating motor 803, or the like.

The wavelength control signal generating unit 818 generates an oscillation wavelength control signal for controlling an oscillation wavelength of the wavelength-variable laser 809 based on the fluctuation component signal outputted from the fluctuation component detecting unit 817.

The reproduction signal processing unit 819 removes a fluctuation component from the interference light detection signal outputted by the interference light detecting unit 815, and generates and outputs a reproduction signal. For example, by using a BEF (band-elimination filter) on a noise due to camming of the stage 802 which is one of the factors that create a fluctuation component, the reproduction signal processing unit 819 can suppress the fluctuation component and retrieve a reproduction signal with a favorable S/N.

The control signal processing unit 820 generates a servo error signal based on the interference light detection signal outputted by the interference light detecting unit 815 and outputs the servo error signal to the servo circuit 805.

According to this configuration, due to an initial optical path difference between signal light and reference light satisfying Expression (6) above and an oscillation wavelength being controlled within an oscillation wavelength variable range of the wavelength-variable laser 809, an optical path fluctuation component comparable to moving a reference light mirror can be canceled out.

Moreover, in the present embodiment, the object shape measuring apparatus 80 corresponds to an example of the modulated signal detecting apparatus, the wavelength-variable laser 809 corresponds to an example of the wavelength-variable laser, the polarizing beam splitter 810 corresponds to an example of the optical divider, the reference light mirror 813 corresponds to an example of the reference light mirror, the polarizing beam splitter 810 corresponds to an example of the interference unit, the interference light detecting unit 815 corresponds to an example of the interference light detecting unit, the fluctuation component detecting unit 817 and the wavelength control signal generating unit 818 correspond to an example of the wavelength control signal generating unit, and the reproduction signal processing unit 819 corresponds to an example of the reproduction signal processing unit.

While a position of the reference light mirror 813 in a direction of an optical axis is adjusted so that the initial optical path length $lm_0$ of the reference light satisfies Expression (6) in the present embodiment, the present invention is not limited thereto. Only the initial optical path length $ld_0$ of the signal light or both the initial optical path length $lm_0$ of the reference light and the initial optical path length $ld_0$ of the reference light may be varied so as to satisfy Expression (6). For example, the initial optical path length $ld_0$ of the signal light may be adapted so as to satisfy Expression (6) by varying an arrangement position of the shape measurement object 801 or the stage 802. In addition, the initial optical path length $ld_0$ of the signal light may be adjusted so as to satisfy Expression (6) by arranging a bypass or an element with a high refractive index on the optical path of the signal light and increasing the optical path length as converted by a refractive index in vacuum.

Furthermore, while the polarization plane of the laser light incident to the polarizing beam splitter 810 is adapted so as to be capable of varying an intensity ratio between the signal light and the reference light by arranging the wavelength-variable laser 809 that has been rotated in advance in a plane perpendicular to the optical axis, the present invention is not limited thereto. For example, a λ/2 plate 823 may be inserted between the wavelength-variable laser 809 and the polarizing beam splitter 810. By rotating the λ/2 plate 823, the polarization plane of the laser light may be rotated to vary the intensity ratio between the signal light and the reference light.

Moreover, while the configuration of the interference light detecting unit 815 has been described as being the same as that of the interference light detecting unit 215 shown in FIG. 7 in the present embodiment, the present invention is not limited to this configuration. For example, the interference light detecting unit 815 may be configured as shown in FIG. 9.

In addition, while the fluctuation component detecting unit 817 and the reproduction signal processing unit 819 use a BPF or a BEF in order to remove a fluctuation noise component outside a frequency band of the signal component in the present embodiment, the present invention is not limited thereto. The fluctuation component detecting unit 817 and the reproduction signal processing unit 819 may remove unnecessary components by subjecting the interference light detection signal to a Fourier transform to convert a time domain signal into a frequency domain signal and dividing a band according to frequency domains.

Furthermore, while the signal processing unit 816 is arranged outside the optical head unit 806 in the present embodiment, a configuration may also be adopted in which the optical head unit 806 includes the signal processing unit 816.

In addition, in the present embodiment, a configuration may be adopted in which the signal processing unit 816 is integrated on a single LSI.

Moreover, in the present embodiment, functions of the signal processing unit 816 may be realized by a computer-executable program and a computer. For example, a program of the signal processing unit 816 is represented by the flow chart shown in FIG. 11.

Seventh Embodiment

In a seventh embodiment of the present invention, further ingenuity is exercised on the arrangement of respective parts inside the optical head unit 206 of the optical disk apparatus according to the first embodiment.

First, in order to promote understanding of the present embodiment, a laser resonator length, an external resonator formed by a laser and an optical disk medium or a mirror, and return light will be described with reference to FIGS. 17 to 19.

Figure 17:
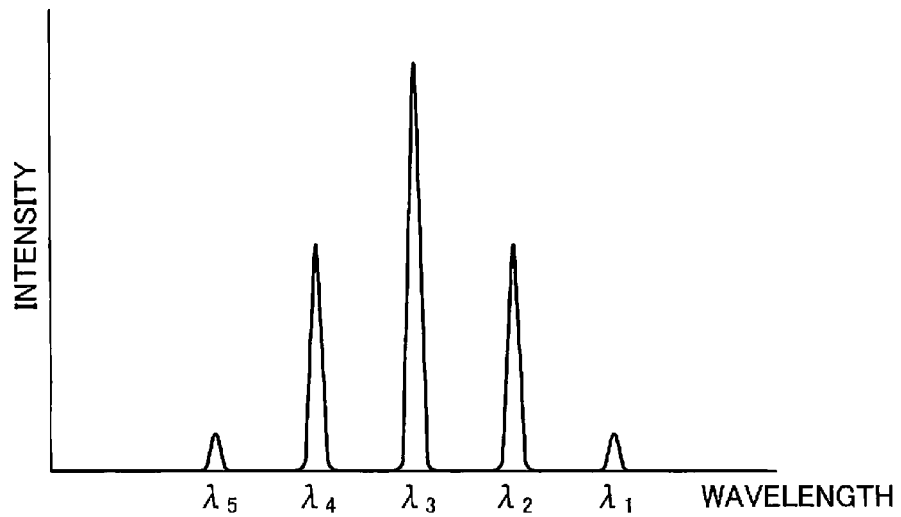
FIG. 17 is a diagram showing an example of a spectral intensity of laser light outputted from a laser mounted on an optical head unit.
Figure 18:
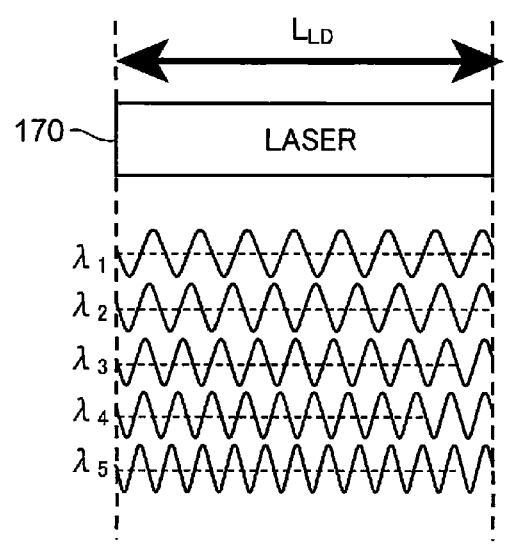
FIG. 18 is a diagram schematically showing laser oscillation in multi-longitudinal mode within a laser resonator as an example of laser oscillation.

FIG. 17 is a diagram showing an example of a spectral intensity of laser light outputted from a laser mounted on an optical head unit. FIG. 18 is a diagram schematically showing laser oscillation in multi-longitudinal mode within a laser resonator as an example of laser oscillation. Examples of a laser 170 that causes such a laser oscillation in the multi-longitudinal mode include a Fabry-Perot laser. An example will now be shown in which, inside the laser 170, a laser oscillation is occurring at five wavelengths corresponding to standing waves which have wavelengths $\lambda_1$ to $\lambda_5$ shown in FIG. 17 and which may exist within the laser resonator. A wavelength at which the laser 170 can oscillate is a wavelength equal to a value which is obtained by Expression (10) below based on a refractive index $n_{ld}$ and an internal resonator length $l_{ld}$ of an internal resonator and which is calculated by dividing an in-vacuum internal resonator length $L_{ld}$ as converted using a refractive index in vacuum set to 1 by an integer, and is limited to wavelengths at which a laser medium of the laser 170 is capable of emitting light.

$$L_{ld}=n_{ld}l_{ld} \qquad (10)$$

Figure 19:
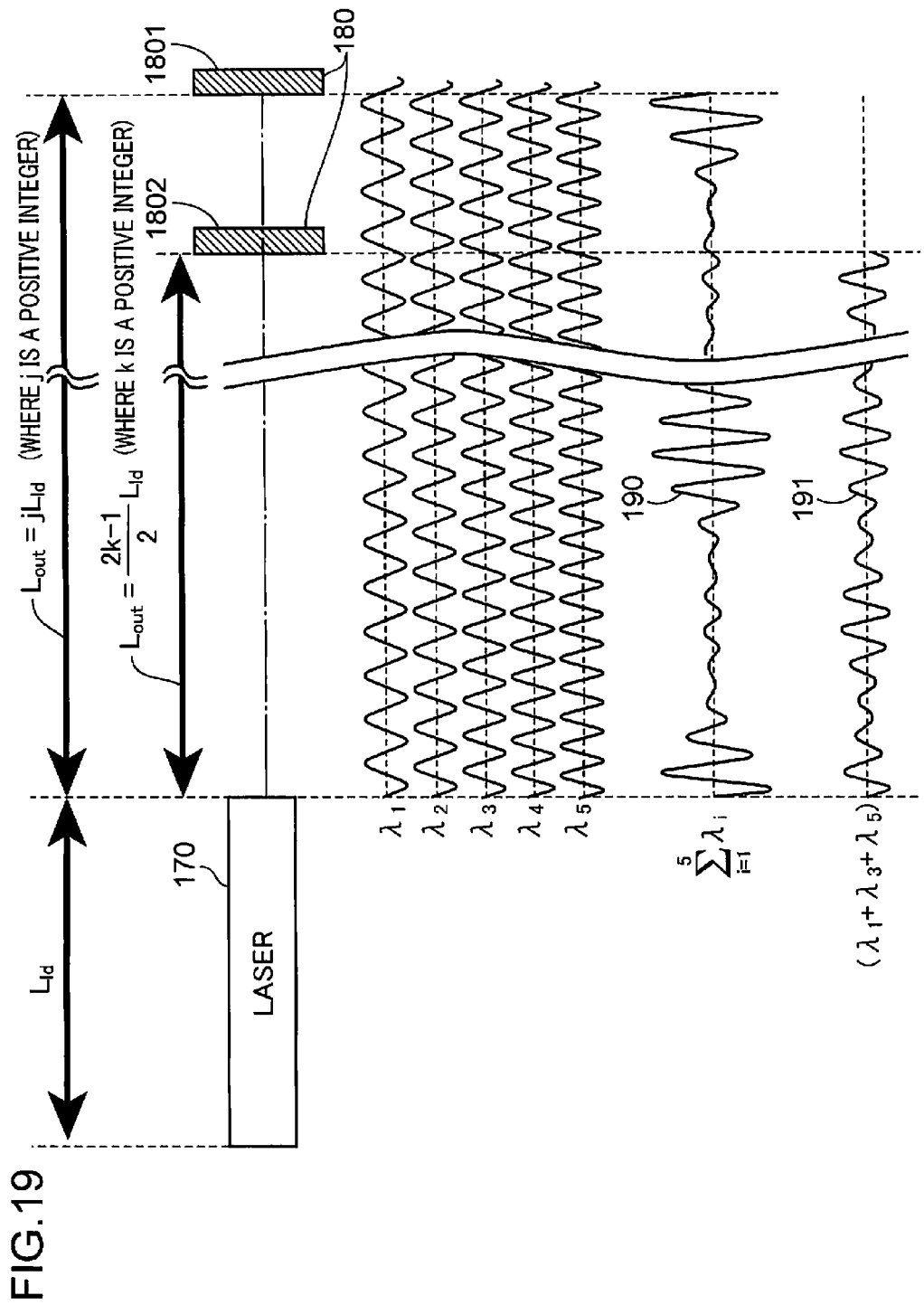
FIG. 19 is a diagram for describing an external resonator.

FIG. 19 is a diagram for describing an external resonator. FIG. 19 schematically depicts a relationship between a front end surface or a back end surface of the laser 170 and a reflecting unit 180 such as an optical disk medium or an optical element (for example, a mirror).

In FIG. 19, the front end face of the laser 170 is set as an emitting end face from which laser light is emitted. A value obtained by multiplying a distance from the emitting end face of the laser 170 to the reflecting unit 180 by a refractive index of the laser light on an optical path is denoted as an in-vacuum external resonator length $L_{out}$. The in-vacuum external resonator length $L_{out}$ represents an optical path length of an external resonator as converted using a refractive index in vacuum of 1 when the external resonator has a refractive index. When the in-vacuum external resonator length $L_{out}$ satisfies specific conditions, the laser light outputted from the laser 170 may also exist as a standing wave between the emitting end face of the laser 170 and the reflecting unit 180. When a standing wave also exists in the external resonator, an unintended laser resonator ends up being formed by the internal resonator and the external resonator of the laser 170. Accordingly, laser oscillation by the unintended laser resonator becomes noise.

In particular, in an optical disk apparatus, the reflecting unit 180 (for example, an information recording layer that becomes a reflecting surface in an optical disk medium) is not always at a constant position. Therefore, when an amplitude of a standing wave produced by overlapping of a plurality of wavelengths by an unintended external resonator is large, a variation in return light amount also increases, which results in greater laser oscillation noise.

Next, conditions of the in-vacuum external resonator length $L_{out}$ in which a return light noise increases will be described through specific examples. When the in-vacuum external resonator length $L_{out}$ satisfies Expression (11) below (when the reflecting unit 180 is at a position 1801 shown in FIG. 19), all of wavelengths $\lambda_1$ to $\lambda_5$ shown in FIGS. 18 and 19 may also exist as standing waves inside the external resonator.

$$L_{out}=jL_{ld} \text{ (where } j \text{ is a positive integer)} \qquad (11)$$

A standing wave 190 shown in FIG. 19 represents a standing wave obtained by adding up all the wavelengths from $\lambda_1$ to $\lambda_5$ when Expression (11) above is satisfied. In other words, this means that when the in-vacuum external resonator length $L_{out}$ is a positive integral multiple of an in-vacuum internal resonator length $L_{ld}$, light of all wavelengths contained in the laser light outputted from the laser 170 also exists as standing waves in the external resonator.

In addition, when the in-vacuum external resonator length $L_{out}$ and the in-vacuum internal resonator length $L_{ld}$ satisfy Expression (12) below (when the reflecting unit 180 is at a position 1802 shown in FIG. 19), the wavelengths $\lambda_1$, $\lambda_3$, and $\lambda_5$ shown in FIGS. 18 and 19 may also exist as standing waves in the external resonator.

$$L_{out} = \frac{2k-1}{2} L_{ld} \qquad (12)$$

(where $k$ is a positive integer)

A standing wave 191 shown in FIG. 19 represents a standing wave obtained by adding up the wavelengths $\lambda_1$, $\lambda_3$, and $\lambda_5$ when Expression (12) above is satisfied. In other words, this means that when the in-vacuum external resonator length $L_{out}$ is shorter than a distance that is a positive integral multiple of the in-vacuum internal resonator length $L_{ld}$ by a distance equivalent to half the in-vacuum internal resonator length $L_{ld}$, light with wavelengths having even numbers of waves among wavelengths oscillated in the laser 170 may also exist in the external resonator as standing waves.

Stated differently, in order to avoid both generation of a standing wave that satisfies Expression (11) above and generation of a standing wave that satisfies Expression (12) above, the in-vacuum external resonator length $L_{out}$ must be prevented from assuming a length that is an integral multiple of ½ of the in-vacuum internal resonator length $L_{ld}$. Furthermore, there are cases where a standing wave exists in which the number of waves is a multiple of three or a multiple of four, and it is obvious that a similar phenomenon is to occur in any case.

In consideration thereof, in order to avoid all standing waves in which the number of waves is a multiple of a positive integer m, the in-vacuum external resonator length $L_{out}$ must be prevented from assuming a length that is an integral multiple of 1/m of the in-vacuum internal resonator length $L_{ld}$ for each m. However, as is apparent from a comparison between the standing wave 190 and the standing wave 191 in FIG. 19, it is also obvious that the smaller the number of waves of a standing wave which may exist, the smaller the effect.

Moreover, while the internal resonator length $l_{ld}$ can be measured relatively easily, it is extremely difficult to measure an refractive index of an internal resonator. Therefore, the in-vacuum internal resonator length $L_{ld}$ may be obtained by measurement. For example, a length corresponding to the in-vacuum internal resonator length $L_{ld}$ can be measured using the laser 170 and a reflecting mirror. First, the laser 170 and the reflecting mirror are arranged so that laser light oscillated by the laser 170 is reflected by the reflecting mirror and returns to the laser 170. When the laser 170 and the reflecting mirror are arranged in this manner, an emitting end face of the laser 170 and the reflecting mirror constitute an external resonator.

In this case, when an external resonator length is varied by varying a position of the reflecting mirror, several points with increased return light noise appear. As an example of measurement of return light noise, an optical element that divides laser light such as a half mirror may be arranged between the laser 170 and the reflecting mirror and an intensity noise of a divided light may be measured. External resonator lengths at which the return light noise increases coincide with distances representing positive integral multiples of the in-vacuum internal resonator length $L_{ld}$ such as $L_{ld}$, $2L_{ld}$, and $3L_{ld}$. Therefore, it is obvious that measuring a minimum distance between two points where the return light noise increases is equivalent to measuring the in-vacuum internal resonator length $L_{ld}$.

Moreover, while an example of a laser in which five wavelengths are oscillated has been described, the present invention is not limited thereto. A similar effect can be produced by an optical pickup and an optical disk apparatus using a laser which oscillates in a longitudinal multimode and which has less than five oscillation wavelengths or five or more oscillation wavelengths.

Figure 20:
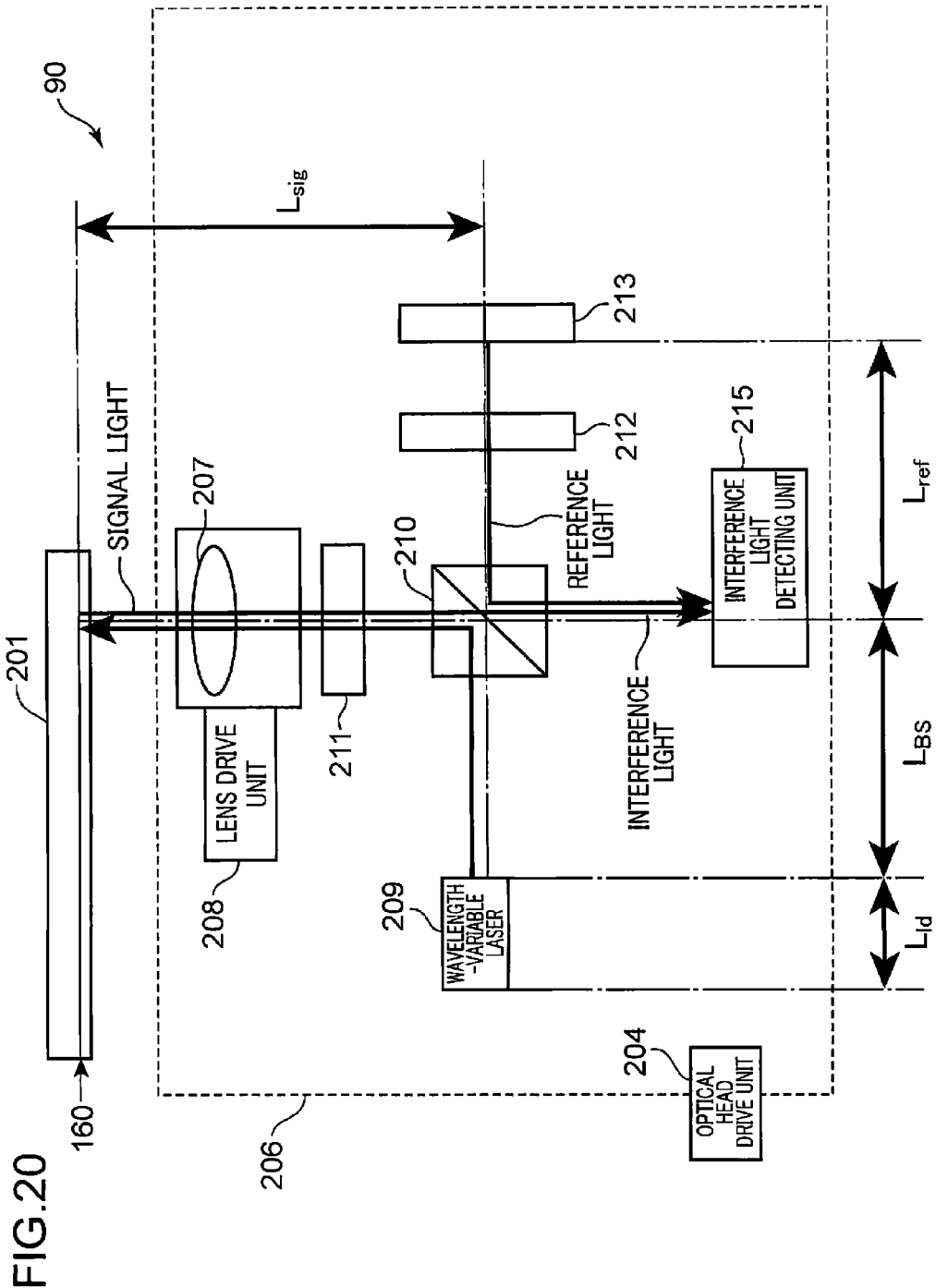
FIG. 20 is a diagram showing a configuration of an optical head unit within an optical disk apparatus according to a seventh embodiment of the present invention.
Figure 21:
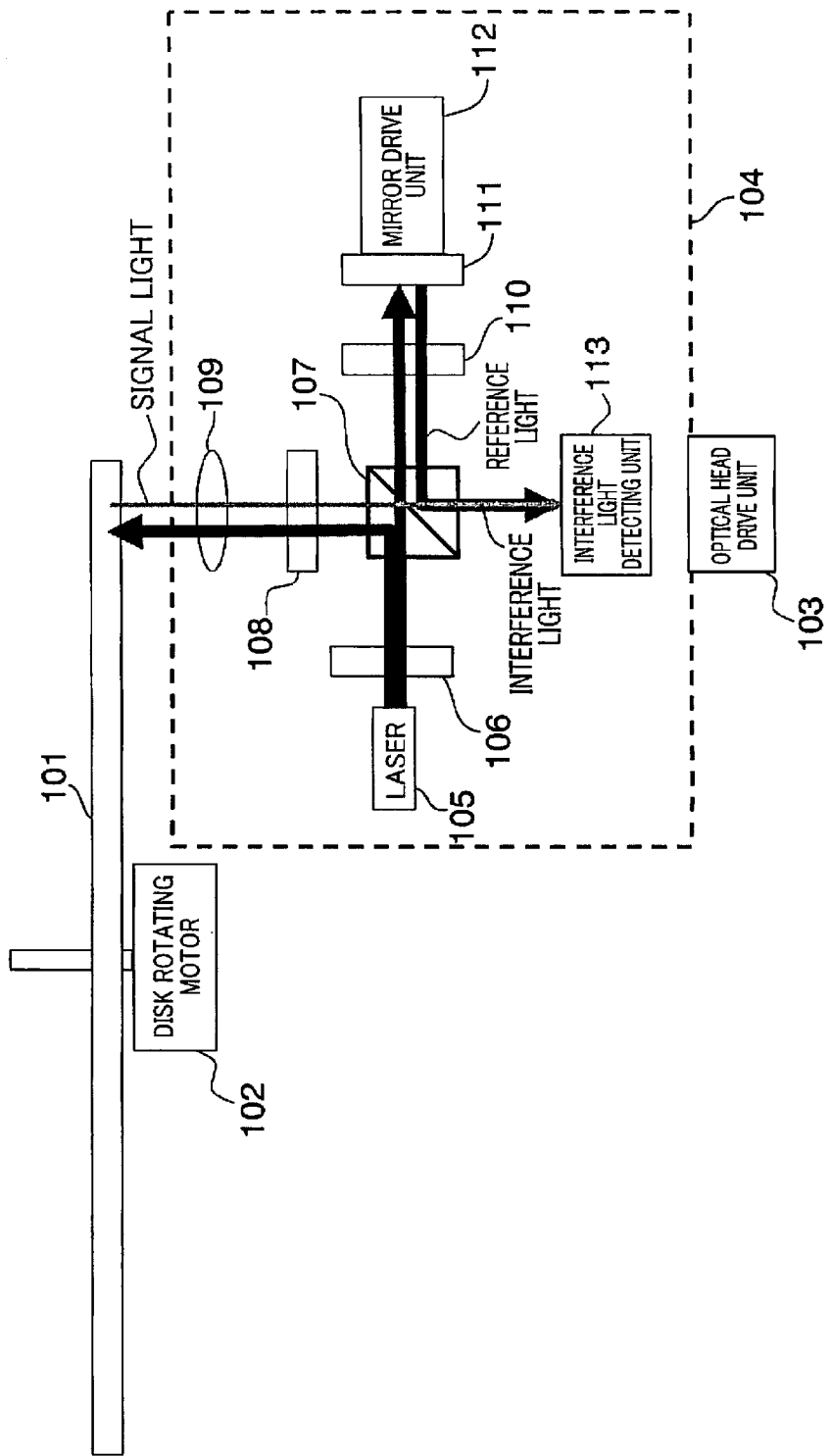
FIG. 21 is a diagram showing a configuration of a conventional interferometric optical disk apparatus.

Next, an optical disk apparatus according to the present embodiment will be concretely described below. FIG. 20 is a diagram showing a configuration of an optical head unit within an optical disk apparatus according to the seventh embodiment of the present invention. In FIG. 20, same components as those shown in FIG. 4 are denoted by same reference numerals and descriptions thereof will be omitted.

The optical disk apparatus 90 comprises a disk rotating motor 202 (not shown), an optical head drive unit 204, a servo circuit 205 (not shown), an optical head unit 206, and a signal processing unit 216 (not shown). Note that the disk rotating motor 202, the servo circuit 205, and the signal processing unit 216 have been omitted in FIG. 20.

The wavelength-variable laser 209 has an internal resonator. If $l_{ld}$ denotes an internal resonator length and $n_{ld}$ denotes a refractive index of the wavelength-variable laser 209, then an in-vacuum internal resonator length $L_{ld}$ when a refractive index in vacuum is set to 1 can be obtained by Expression (10) above. In addition, $L_{BS}$ denotes an in-vacuum converted optical path length from the emitting end face of the wavelength-variable laser 209 to a splitting surface of a polarizing beam splitter (PBS) 210 which takes a refractive index, a length, and a distance in vacuum of each optical element into consideration and which is an optical path length of laser light as converted using a refractive index in vacuum n (n=1). In a similar manner, $L_{sig}$ denotes an in-vacuum converted optical path length of signal light from the splitting surface of the PBS 210 to an information recording layer 160 of the optical disk medium 201 as converted using a refractive index in vacuum, and $L_{ref}$ denotes an in-vacuum converted optical path length of reference light from the splitting surface of the PBS 210 to the reference light mirror 213 which takes a refractive index, a length, and a distance in vacuum of each optical element into consideration and which is converted using a refractive index in vacuum. However, when fluctuation due to camming of the information recording layer 160 during rotation of the optical disk medium 201 has a large effect, the optical path length of the signal light is a value of an optical path length from the splitting surface of the PBS 210 to a center of a camming range on the information recording layer 160 as converted using a refractive index in vacuum.

In this case, the in-vacuum converted optical path length $L_{sig}$ of the signal light and the in-vacuum converted optical path length $L_{ref}$ of the reference light shown in FIG. 17 have the following relationship with an initial optical path length $ld_0$ that is a length of an optical path along which the signal light travels as converted using a refractive index in vacuum and an initial optical path length $lm_0$ that is a length of an optical path along which the reference light travels as converted using a refractive index in vacuum.

$$L_{sig} \approx \frac{ld_0}{2}, L_{ref} \approx \frac{lm_0}{2}$$

With respect to both the signal light and the reference light, in order to reduce noise due to return light, the in-vacuum converted distances described above must be set to distances where a large number of standing waves are not generated. With respect to a return light of the signal light, in order to prevent the emitting end face of the wavelength-variable laser 209 and the information recording layer 160 of the optical disk medium 201 from constituting an external resonator in which many standing waves exist, the respective optical elements (the wavelength-variable laser 209, the polarizing beam splitter 210, and the reference light mirror 213) in the optical head unit 206 are arranged so as to satisfy Expression (13) below.

$$L_{sig} + L_{BS} \approx \frac{ld_0}{2} + L_{BS} \neq sL_{ld} \tag{13}$$

(where $s$ is a positive integer)

With respect to a return light of the reference light, in order to prevent the emitting end face of the wavelength-variable laser 209 and the reference light mirror 213 from constituting an external resonator in which many standing waves exist, the respective optical elements (the wavelength-variable laser 209, the polarizing beam splitter 210, and the reference light mirror 213) in the optical head unit 206 are arranged so as to satisfy Expression (14) below.

$$L_{ref} + L_{BS} \approx \frac{lm_0}{2} + L_{BS} \neq tL_{ld} \tag{14}$$

(where $t$ is a positive integer)

In addition, in order to cause interference between the split signal light and reference light, the respective optical elements (the wavelength-variable laser 209, the polarizing beam splitter 210, and the reference light mirror 213) in the optical head unit 206 are arranged so that a difference between the in-vacuum converted optical path length $L_{sig}$ of the signal light and the in-vacuum converted optical path length $L_{ref}$ of the reference light satisfies Expression (15) below.

$$uL_{ld} - \frac{L_{coh}}{2} \leq |L_{sig} - L_{ref}| \leq uL_{ld} + \frac{L_{coh}}{2} \tag{15}$$

$$\left(uL_{ld} - \frac{L_{coh}}{2} \leq \frac{|ld_0 - lm_0|}{2} \leq uL_{ld} + \frac{L_{coh}}{2}\right)$$

(where $u$ is an integer)

In Expression (15), $L_{coh}$ represents a coherence length of laser light outputted from the wavelength-variable laser 209. The coherence length $L_{coh}$ is expressed by Expression (16) below using a full width at half maximum $\Delta v$ of an oscillation wavelength spectrum of the laser light and the speed of light c.

$$L_{coh} = \frac{c}{\Delta v} \tag{16}$$

By arranging the respective optical elements (the wavelength-variable laser 209, the polarizing beam splitter 210, and the reference light mirror 213) in the optical head unit 206 so as to satisfy Expressions (13), (14), and (15) above, noise due to the return lights of the signal light and the reference light can be reduced and, at the same time, interference light obtained by an interference between the signal light and the reference light can be inputted to the interference light detecting unit 215.

According to this configuration, due to an initial optical path difference between signal light and reference light satisfying Expression (6) above and an oscillation wavelength being controlled within an oscillation wavelength variable range of the wavelength-variable laser 209, an optical path fluctuation component can be canceled out. In addition, both the suppression of return light noise by reducing external resonance caused by return lights of the signal light and the reference light and the amplification of the weak signal light by the reference light by causing an interference between the signal light and the reference light can be achieved at the same time. Therefore, an optical disk apparatus is realized which, compared to a conventional optical disk apparatus, achieves an increased S/N of a reproduction signal even with respect to large-capacity optical disk media having a higher density and a greater number of layers.

Moreover, Expressions (13), (14), and (15) can be further generalized as Expressions (17), (18), and (19) below.

$$\frac{ld_0}{2} + L_{BS} \neq S\frac{L_{ld}}{m} \tag{17}$$

(where $s$ is a positive integer and $m$ is a positive integer)

$$\frac{lm_0}{2} + L_{BS} \neq t\frac{L_{ld}}{m} \tag{18}$$

(where $t$ is a positive integer)

$$u\frac{L_{ld}}{m} - \frac{\Delta L}{2} \leq \frac{|ld_0 - lm_0|}{2} \leq u\frac{L_{ld}}{m} + \frac{\Delta L}{2} \tag{19}$$

(where $u$ is an integer)

In Expressions (17), (18), and (19) above, $L_{ld}$ denotes an in-vacuum internal resonator length of the wavelength-variable laser 209 which is obtained as a product of an internal resonator length of the wavelength-variable laser 209 and an internal resonator refractive index of the wavelength-variable laser 209, $L_{BS}$ denotes an in-vacuum converted optical path length of laser light emitted from the wavelength-variable laser 209 from the emitting end face of the wavelength-variable laser 209 to the polarizing beam splitter (optical divider) 210, and $\Delta L$ denotes an interference permissible optical path length of laser light emitted from the wavelength-variable laser 209.

The wavelength-variable laser 209, the polarizing beam splitter 210, and the reference light mirror 213 are arranged at positions which simultaneously satisfy Expressions (17) to (19) above.

Moreover, while the respective optical elements are arranged so that in-vacuum converted optical path lengths satisfy Expressions (13), (14), and (15) in the present embodiment, a similar effect is produced when positions of the respective optical elements are controlled so that in-vacuum converted optical path lengths satisfy Expressions (13), (14), and (15). For example, a position of the reference light mirror 213 may be varied by further providing a drive mechanism that drives the reference light mirror 213. In addition, positional control of the reference light mirror 213 may be performed by detecting a variation in an oscillation wavelength of the wavelength-variable laser 209, detecting camming of the optical disk medium 201, or the like. Furthermore, the position of the reference light mirror 213 may be varied using a same drive mechanism as the drive mechanism of the lens drive unit 208 which drives the objective lens 207.

In addition, while a range of an optical path length difference between an optical path length of the signal light and an optical path length of the reference light is defined by the coherence length $L_{coh}$ in Expression (15) in the present embodiment, when an S/N exceeds an allowable range of the system, the respective optical elements may be arranged or controlled so that the optical path length difference falls within a range defined by a narrower value than the coherence length $L_{coh}$.

Furthermore, while an optical path of laser light prior to splitting, an optical path of the signal light, and an optical path of the reference light are all constituted by the respective optical elements and air in FIG. 20 in the present embodiment, the present invention is not limited thereto. For example, a part of or all of the optical path of laser light prior to splitting, the optical path of the signal light, and the optical path of the reference light may be constituted using complex optical function elements such as nano-photonic material, an optical waveguide, or an optical fiber.

In addition, while a positional relationship among respective optical elements in the optical head unit 206 has been described with reference to FIG. 20 that in-vacuum converted optical path lengths may satisfy Expressions (13), (14), and (15) in the present embodiment, all wavelengths at which the number of waves becomes an even number among standing waves oscillated in the wavelength-variable laser 209 may be prevented from simultaneously becoming standing waves in an external resonator. More specifically, the respective optical elements (the wavelength-variable laser 209, the polarizing beam splitter 210, and the reference light mirror 213) in the optical head unit 206 may be arranged or controlled so that the in-vacuum converted optical path lengths satisfy Expressions (20), (21), and (22) below.

$$L_{sig} + L_{BS} \approx \frac{ld_0}{2} + L_{BS} \neq s'\frac{L_{ld}}{2} \quad (20)$$

(where $s'$ is a positive integer)

$$L_{ref} + L_{BS} \approx \frac{lm_0}{2} + L_{BS} \neq t'\frac{L_{ld}}{2} \quad (21)$$

(where $t'$ is a positive integer)

$$u'\frac{L_{ld}}{2} - \frac{L_{coh}}{2} \leq |L_{sig} - L_{ref}| \leq u'\frac{L_{ld}}{2} + \frac{L_{coh}}{2} \quad (22)$$

$$\left(u'\frac{L_{ld}}{2} - \frac{L_{coh}}{2} \leq \frac{|ld_0 - lm_0|}{2} \leq u'\frac{L_{ld}}{2} + \frac{L_{coh}}{2}\right)$$

(where $u'$ is an integer)

Furthermore, while a positional relationship among respective optical elements in the optical head unit 206 has been described with reference to FIG. 20 that in-vacuum converted optical path lengths may satisfy Expressions (13), (14), and (15) in the present embodiment, the present invention is not limited to arrangement of optical elements or controlling optical elements. A similar effect may be produced by inserting one or a plurality of optical elements having a refractive index of 1 or higher in the optical path of laser light prior to splitting, the optical path of the signal light, and the optical path of the reference light so that the in-vacuum converted optical path lengths satisfy Expressions (13), (14), and (15).

In addition, the in-vacuum internal resonator length $L_{ld}$ is dependent on an inputted current value of the wavelength-variable laser 209 or on ambient temperature. Therefore, a single appropriate in-vacuum internal resonator length such as an average value ($L_{ld(ave)}$) of all possible in-vacuum internal resonator lengths $L_{ld}$ or a reference value ($L_{ld0}$) when a frequently-used input current value is set under a temperature environment with a high frequency of use may be obtained and assigned to the in-vacuum internal resonator length $L_{ld}$ in Expressions (13), (14), and (15).

Furthermore, the optical head unit may further have a reference light mirror drive unit which drives a mirror position of the reference light mirror 213 with a wavelength-varying operation of the wavelength-variable laser 209. Moreover, a same configuration as the mirror drive unit 223 described in the second embodiment may be adopted as a configuration of the reference light mirror drive unit.

In addition, when the optical disk medium 201 has a plurality of reflecting layers (information recording layers), the in-vacuum converted optical path length $L_{sig}$ of the signal light may be a length from the polarizing beam splitter 210 to one specific reflecting layer (for example, a reflecting layer with a lowest S/N) or may be an average value of lengths from the polarizing beam splitter 210 to all reflecting layers.

The specific embodiments described above primarily include an invention configured as described below.

A modulated signal detecting apparatus according to an aspect of the present invention is a modulated signal detecting apparatus for detecting a modulated signal, comprising: a wavelength-variable laser which emits laser light and which is capable of varying oscillation wavelengths; an optical divider which splits the laser light emitted from the wavelength-variable laser into signal light and reference light; a reference light mirror which is arranged on an optical path of the reference light; an interference unit which causes an interference between the signal light that has been modulated and the reference light that has been reflected by the reference light mirror; an interference light detecting unit which detects interference light created by the interference unit and which outputs interference light detection signal; and a wavelength control signal generating unit which generates an oscillation wavelength control signal for controlling an oscillation wavelength of the wavelength-variable laser based on the interference light detection signal, wherein when $ld_0$ denotes an initial optical path length that is a length of an optical path, along which the signal light travels, as converted using a refractive index in vacuum, $lm_0$ denotes an initial optical path length that is a length of an optical path, along which the reference light travels, as converted using a refractive index in vacuum, $\Delta l$ denotes a fluctuation width of a difference in optical path lengths between the signal light and the reference light as converted using a refractive index in vacuum, $\lambda_0$ denotes a central oscillation wavelength of the wavelength-variable laser, and $\Delta\lambda$ denotes an oscillation wavelength variable range of the wavelength-variable laser, then an initial optical path difference $|ld_0-lm_0|$ satisfies Expression (23) below.

$$|ld_0 - lm_0| > \frac{\Delta l}{\Delta \lambda} \lambda_o \quad (23)$$

According to this configuration, the wavelength-variable laser which is capable of varying oscillation wavelengths emits laser light. The optical divider splits the laser light emitted from the wavelength-variable laser into signal light and reference light. The reference light mirror is arranged on an optical path of the reference light. The interference unit causes an interference between the signal light that has been modulated and the reference light that has been reflected by the reference light mirror. The interference light detecting unit detects interference light created by the interference unit and outputs an interference light detection signal. The wavelength control signal generating unit generates an oscillation wavelength control signal for controlling an oscillation wavelength of the wavelength-variable laser based on the interference light detection signal. In this case, when $ld_0$ denotes an initial optical path length that is a length of an optical path, along which the signal light travels, as converted using a refractive index in vacuum, $lm_0$ denotes an initial optical path length that is a length of an optical path, along which the reference light travels, as converted using a refractive index in vacuum, $\Delta l$ denotes a fluctuation width of a difference in optical path lengths between the signal light and the reference light as converted using a refractive index in vacuum, $\lambda_o$ denotes a central oscillation wavelength of the wavelength-variable laser, and $\Delta \lambda$ denotes an oscillation wavelength variable range of the wavelength-variable laser, then an initial optical path difference $|ld_0-lm_0|$ satisfies Expression (23) above.

Therefore, due to an initial optical path difference between the signal light and the reference light satisfying Expression (23) above and the oscillation wavelength being controlled within the oscillation wavelength variable range of the wavelength-variable laser, a fluctuation component of optical path lengths of the signal light and the reference light can be canceled out and a modulated signal with a high S/N ratio can be detected.

In addition, in the modulated signal detecting apparatus described above, favorably, the wavelength control signal generating unit detects a fluctuation component in a band other than a modulated signal band from the interference light detection signal and generates the oscillation wavelength control signal based on the detected fluctuation component.

According to this configuration, since a fluctuation component in a band other than the modulated signal band is detected from the interference light detection signal and the oscillation wavelength control signal is generated based on the detected fluctuation component, an oscillation wavelength control signal can be generated from which a fluctuation component due to unnecessary disturbance has been canceled out.

Furthermore, in the modulated signal detecting apparatus described above, favorably, the modulated signal detecting apparatus further comprises an objective lens which focuses the signal light and a servo error signal generating unit which generates a servo error signal corresponding to a focus position of the objective lens from the interference light detection signal, and the wavelength control signal generating unit generates the oscillation wavelength control signal based on the servo error signal.

According to this configuration, the objective lens focuses the signal light. The servo error signal generating unit generates a servo error signal corresponding to a focus position of the objective lens from the interference light detection signal. In addition, the wavelength control signal generating unit generates the oscillation wavelength control signal based on the servo error signal.

Therefore, an optical path fluctuation of the signal light can now be calculated from a servo error signal corresponding to a focus position of the objective lens and a more stable oscillation wavelength control signal for the wavelength-variable laser can be generated.

In addition, in the modulated signal detecting apparatus described above, favorably, the signal light is modulated by an optical disk medium which is arranged on the optical path of the signal light and on which data is recorded, and the modulated signal detecting apparatus further comprises a reproduction signal processing unit which reproduces the data recorded on the optical disk medium by generating a reproduction signal from the interference light detection signal.

According to this configuration, the signal light is modulated by an optical disk medium which is arranged on the optical path of the signal light and on which data is recorded. The reproduction signal processing unit reproduces data recorded on the optical disk medium by generating a reproduction signal from the interference light detection signal.

Therefore, since a reproduction signal is generated from the interference light detection signal and the reproduction signal includes a modulated signal that has been modulated by an information recording layer of the optical disk medium, data recorded on the optical disk medium can be reproduced.

Furthermore, in the modulated signal detecting apparatus described above, favorably, the signal light is modulated by an object which is arranged on the optical path of the signal light and which has a predetermined surface shape, and the modulated signal detecting apparatus further comprises a reproduction signal processing unit which measures the surface shape of the object by generating a reproduction signal from the interference light detection signal.

According to this configuration, the signal light is modulated by an object which is arranged on the optical path of the signal light and which has a predetermined surface shape. The reproduction signal processing unit measures the surface shape of the object by generating a reproduction signal from the interference light detection signal.

Therefore, since a reproduction signal is generated from the interference light detection signal and the reproduction signal includes a modulated signal that has been modulated by irregular shapes on a surface of the object, the surface shape of the object can be measured.

In addition, in the modulated signal detecting apparatus described above, favorably, the modulated signal detecting apparatus further comprises an optical modulating element which is arranged on the optical path of the signal light and which varies optical characteristics according to data to be transmitted, the interference unit causes an interference between the signal light modulated by being transmitted through the optical modulating element and the reference light reflected by the reference light mirror, and the modulated signal detecting apparatus further comprises a reproduction signal processing unit which transmits the data using light by generating a reproduction signal from the interference light detection signal.

According to this configuration, the optical modulating element arranged on the optical path of the signal light varies optical characteristics according to data to be transmitted.

The interference unit causes an interference between the signal light that has been modulated by being transmitted through the optical modulating element and the reference light that has been reflected by the reference light mirror. The reproduction signal processing unit transmits the data using light by generating a reproduction signal from the interference light detection signal.

Therefore, since a reproduction signal is generated from the interference light detection signal and the reproduction signal includes a modulated signal that has been modulated by the data to be transmitted, the data can be transmitted using light.

Furthermore, in the modulated signal detecting apparatus described above, favorably, the optical characteristics are a refractive index. According to this configuration, by varying a refractive index of an element according to data to be transmitted, light that is transmitted through the element can be modulated.

In addition, in the modulated signal detecting apparatus described above, favorably, the optical characteristics are a transmittance. According to this configuration, by varying a transmittance of an element according to data to be transmitted, light that is transmitted through the element can be modulated.

Furthermore, in the modulated signal detecting apparatus described above, favorably, the modulated signal detecting apparatus further comprises a reference light mirror drive unit which varies the initial optical path difference $|ld_0-lm_0|$ by moving a position of the reference light mirror.

According to this configuration, the reference light mirror drive unit varies the initial optical path difference $|ld_0-lm_0|$ by moving the position of the reference light mirror.

Therefore, since the initial optical path length $lm_0$ of the reference light can be varied by varying the position of the reference light mirror, the reference light mirror can be arranged so as to always satisfy Expression (23) above while accommodating a variation in the initial optical path length $ld_0$ of the signal light or a variation in the central oscillation wavelength $\lambda_0$.

In addition, in the modulated signal detecting apparatus described above, favorably, the wavelength-variable laser has an internal resonator, and when $L_{ld}$ denotes an in-vacuum internal resonator length of the wavelength-variable laser which is obtained as a product of an internal resonator length of the wavelength-variable laser and an internal resonator refractive index of the wavelength-variable laser, $L_{BS}$ denotes an in-vacuum converted optical path length of laser light emitted from the wavelength-variable laser from the emitting end face of the wavelength-variable laser to the optical divider, and $\Delta L$ denotes an interference permissible optical path length of the laser light emitted from the wavelength-variable laser, then the wavelength-variable laser, the optical divider, and the reference light mirror are arranged at positions that simultaneously satisfy Expressions (24) to (26) below.

$$\frac{ld_0}{2} + L_{BS} \neq s\frac{L_{ld}}{m} \qquad (24)$$

(where $s$ is a positive integer and $m$ is a positive integer)

$$\frac{lm_0}{2} + L_{BS} \neq t\frac{L_{ld}}{m} \qquad (25)$$

(where $t$ is a positive integer)

$$u\frac{L_{ld}}{m} - \frac{\Delta L}{2} \leq \frac{|ld_0 - lm_0|}{2} \leq u\frac{L_{ld}}{m} + \frac{\Delta L}{2} \qquad (26)$$

(where $u$ is an integer)

According to this configuration, the wavelength-variable laser has an internal resonator. When $L_{ld}$ denotes an in-vacuum internal resonator length of the wavelength-variable laser which is obtained as a product of an internal resonator length of the wavelength-variable laser and an internal resonator refractive index of the wavelength-variable laser, $L_{BS}$ denotes an in-vacuum converted optical path length of laser light emitted from the wavelength-variable laser from the emitting end face of the wavelength-variable laser to the optical divider, and $\Delta L$ denotes an interference permissible optical path length of the laser light emitted from the wavelength-variable laser, then the wavelength-variable laser, the optical divider, and the reference light mirror are arranged at positions that simultaneously satisfy Expressions (24) to (26) above.

Therefore, by arranging the wavelength-variable laser, the optical divider, and the reference light mirror so as to satisfy Expressions (24) to (26) above, noise generated by external resonance due to return lights of the signal light and the reference light can be reduced and a modulated signal with a high S/N ratio can be detected.

Furthermore, in the modulated signal detecting apparatus described above, favorably, the interference permissible optical path length $\Delta L$ is a coherence length of the laser light.

According to this configuration, since the interference permissible optical path length $\Delta L$ is a coherence length of the laser light, the coherence length can be easily calculated using a full width at half maximum of an oscillation wavelength spectrum of the laser light and the speed of light.

In addition, in the modulated signal detecting apparatus described above, favorably, the positive integer m in Expressions (24) to (26) above is 1. According to this configuration, standing waves in which the number of waves is a multiple of a positive integer can be avoided and noise generated by external resonance due to return lights of the signal light and the reference light can be reduced.

Furthermore, in the modulated signal detecting apparatus described above, favorably, the modulated signal detecting apparatus further comprises a reference light mirror drive unit which moves the reference light mirror to a position that simultaneously satisfies Expressions (24) to (26) above.

According to this configuration, the reference light mirror drive unit moves the reference light mirror to a position that simultaneously satisfies Expressions (24) to (26) above. Therefore, since the initial optical path length $lm_0$ of the reference light can be varied by varying the position of the reference light mirror, the reference light mirror can be arranged so as to simultaneously satisfy Expressions (24) to (26) above while accommodating a variation in the initial optical path length $ld_0$ of the signal light or a variation in the central oscillation wavelength $\lambda_0$.

A modulated signal detecting method according to another aspect of the present invention is a modulated signal detecting method of detecting a modulated signal, the modulated signal detecting method comprising: laser light emitting step of emitting laser light from a wavelength-variable laser which is capable of varying oscillation wavelengths; an optical splitting step of splitting the laser light emitted from the wavelength-variable laser into signal light and reference light; a modulating step of modulating the signal light; a reference light reflecting step of reflecting the reference light by a reference light mirror arranged on an optical path of the reference light; an interfering step of causing an interference between the signal light that has been modulated in the modulating step and the reference light that has been reflected in the reference light reflecting step; an interference light detecting step of detecting interference light created in the interfering step and outputting an interference light detection signal; and a signal processing step of processing the interference light detection signal, wherein the signal processing step includes a wavelength control signal generating step of generating an oscillation wavelength control signal for controlling an oscillation wavelength of the wavelength-variable laser based on the interference light detection signal, and when $ld_0$ denotes an initial optical path length that is a length of an optical path, along which the signal light travels, as converted using a refractive index in vacuum, $lm_0$ denotes an initial optical path length that is a length of an optical path, along which the reference light travels, as converted using a refractive index in vacuum, $\Delta l$ denotes a fluctuation width of a difference in optical path lengths between the signal light and the reference light as converted using a refractive index in vacuum, $\lambda_0$ denotes a central oscillation wavelength of the wavelength-variable laser, and $\Delta \lambda$ denotes an oscillation wavelength variable range of the wavelength-variable laser, then an initial optical path difference $|ld_0-lm_0|$ satisfies Expression (27) below.

$$|ld_0 - lm_0| > \frac{\Delta l}{\Delta \lambda} \lambda_o \quad (27)$$

According to this configuration, in the laser light emitting step, laser light is emitted from a wavelength-variable laser which is capable of varying oscillation wavelengths. In the optical splitting step, the laser light emitted from the wavelength-variable laser is split into signal light and reference light. In the modulating step, the signal light is modulated. In the reference light reflecting step, the reference light is reflected by a reference light mirror arranged on an optical path of the reference light. In the interfering step, an interference is caused between the signal light that has been modulated in the modulating step and the reference light that has been reflected in the reference light reflecting step. In the interference light detecting step, interference light created in the interfering step is detected and an interference light detection signal is outputted. In the signal processing step, the interference light detection signal is processed. In the wavelength control signal generating step, an oscillation wavelength control signal for controlling an oscillation wavelength of the wavelength-variable laser is generated based on the interference light detection signal. In this case, when $ld_0$ denotes an initial optical path length that is a length of an optical path, along which the signal light travels, as converted using a refractive index in vacuum, $lm_0$ denotes an initial optical path length that is a length of an optical path, along which the reference light travels, as converted using a refractive index in vacuum, $\Delta l$ denotes a fluctuation width of a difference in optical path lengths between the signal light and the reference light as converted using a refractive index in vacuum, $\lambda_0$ denotes a central oscillation wavelength of the wavelength-variable laser, and $\Delta \lambda$ denotes an oscillation wavelength variable range of the wavelength-variable laser, then an initial optical path difference $|ld_0-lm_0|$ satisfies Expression (27) above.

Therefore, due to an initial optical path difference between the signal light and the reference light satisfying Expression (27) above and the oscillation wavelength being controlled within the oscillation wavelength variable range of the wavelength-variable laser, a fluctuation component of optical path lengths of the signal light and the reference light can be canceled out and a modulated signal with a high S/N ratio can be detected.

It is to be understood that the specific embodiments or examples described in Description of Embodiments are merely illustrative of the technical contents of the present invention, and that the present invention should not be construed as being limited to such specific examples. Obviously, many modifications and variations of the present invention are possible without departing from the spirit of the invention and the scope of the following claims.

INDUSTRIAL APPLICABILITY

The modulated signal detecting apparatus and the modulated signal detecting method according to the present invention are capable of detecting a modulated signal at a high S/N ratio and are useful as a modulated signal detecting apparatus and a modulated signal detecting method for detecting a modulated signal. In addition, the modulated signal detecting apparatus and the modulated signal detecting method according to the present invention are applicable to uses such as an optical communication apparatus and an object shape measuring apparatus.

The invention claimed is:

1. A modulated signal detecting apparatus for detecting a modulated signal, comprising:

a wavelength-variable laser which emits laser light and which is capable of varying oscillation wavelengths;

an optical divider which splits the laser light emitted from the wavelength-variable laser into signal light and reference light;

a reference light mirror which is arranged on an optical path of the reference light;

an interference unit which causes an interference between the signal light that has been modulated and the reference light that has been reflected by the reference light mirror;

an interference light detecting unit which detects interference light created by the interference unit and which outputs an interference light detection signal; and a wavelength control signal generating unit which generates an oscillation wavelength control signal for controlling an oscillation wavelength of the wavelength-variable laser based on the interference light detection signal, wherein when $ld_0$ denotes an initial optical path length that is a length of an optical path, along which the signal light travels, as converted using a refractive index in vacuum, $lm_0$ denotes an initial optical path length that is a length of an optical path, along which the reference light travels, as converted using a refractive index in vacuum, $\Delta l$ denotes a fluctuation width of a difference in optical path lengths between the signal light and the reference light as converted using a refractive index in vacuum, $\lambda_0$ denotes a central oscillation wavelength of the wavelength-variable laser, and $\Delta \lambda$ denotes an oscillation wavelength variable range of the wavelength-variable laser, then an initial optical path difference $|ld_0-lm_0|$ satisfies Expression (1) below:

$$|ld_0 - lm_0| > \frac{\Delta l}{\Delta \lambda}\lambda_o. \qquad (1)$$

2. The modulated signal detecting apparatus according to claim 1, wherein the wavelength control signal generating unit detects a fluctuation component in a band other than a modulated signal band from the interference light detection signal and generates the oscillation wavelength control signal based on the detected fluctuation component.

3. The modulated signal detecting apparatus according to claim 1, further comprising:
an objective lens which focuses the signal light, and
a servo error signal generating unit which generates a servo error signal corresponding to a focus position of the objective lens from the interference light detection signal, wherein
the wavelength control signal generating unit generates the oscillation wavelength control signal based on the servo error signal.

4. The modulated signal detecting apparatus according to claim 1, wherein
the signal light is modulated by an optical disk medium which is arranged on the optical path of the signal light and on which data is recorded, and
the modulated signal detecting apparatus further comprises a reproduction signal processing unit which reproduces the data recorded on the optical disk medium by generating a reproduction signal from the interference light detection signal.

5. The modulated signal detecting apparatus according to claim 1, wherein
the signal light is modulated by an object which is arranged on the optical path of the signal light and which has a predetermined surface shape, and
the modulated signal detecting apparatus further comprises a reproduction signal processing unit which measures the surface shape of the object by generating a reproduction signal from the interference light detection signal.

6. The modulated signal detecting apparatus according to claim 1, further comprising an optical modulating element which is arranged on the optical path of the signal light and which varies optical characteristics according to data to be transmitted, wherein
the interference unit causes an interference between the signal light modulated by being transmitted through the optical modulating element and the reference light reflected by the reference light mirror, and
the modulated signal detecting apparatus further comprises a reproduction signal processing unit which transmits the data using light by generating a reproduction signal from the interference light detection signal.

7. The modulated signal detecting apparatus according to claim 6, wherein the optical characteristics are a refractive index.

8. The modulated signal detecting apparatus according to claim 6, wherein the optical characteristics are a transmittance.

9. The modulated signal detecting apparatus according to claim 1, further comprising a reference light mirror drive unit which varies the initial optical path difference $|ld_0-lm_0|$ by moving a position of the reference light mirror.

10. The modulated signal detecting apparatus according to claim 1, wherein
the wavelength-variable laser has an internal resonator, and
when $L_{ld}$ denotes an in-vacuum internal resonator length of the wavelength-variable laser which is obtained as a product of an internal resonator length of the wavelength-variable laser and an internal resonator refractive index of the wavelength-variable laser, $L_{BS}$ denotes an in-vacuum converted optical path length of laser light emitted from the wavelength-variable laser from an emitting end face of the wavelength-variable laser to the optical divider, and $\Delta L$ denotes an interference permissible optical path length of the laser light emitted from the wavelength-variable laser, then
the wavelength-variable laser, the optical divider, and the reference light mirror are arranged at positions that simultaneously satisfy Expressions (2) to (4) below:

$$\frac{ld_0}{2} + L_{BS} \neq s\frac{L_{ld}}{m} \qquad (2)$$

(where $s$ is a positive integer and $m$ is a positive integer)

$$\frac{lm_0}{2} + L_{BS} \neq t\frac{L_{ld}}{m} \qquad (3)$$

(where $t$ is a positive integer)

$$u\frac{L_{ld}}{m} - \frac{\Delta L}{2} \leq \frac{|ld_0 - lm_0|}{2} \leq u\frac{L_{ld}}{m} + \frac{\Delta L}{2} \qquad (4)$$

(where $u$ is an integer).

11. The modulated signal detecting apparatus according to claim 10, wherein the interference permissible optical path length $\Delta L$ is a coherence length of the laser light.

12. The modulated signal detecting apparatus according to claim 10, wherein the positive integer m in the Expressions (2) to (4) is 1.

13. The modulated signal detecting apparatus according to claim 10, further comprising a reference light mirror drive unit which moves the reference light mirror to a position that simultaneously satisfies the Expressions (2) to (4).

14. A modulated signal detecting method of detecting a modulated signal, the method comprising:
a laser light emitting step of emitting laser light from a wavelength-variable laser which is capable of varying oscillation wavelengths;
an optical splitting step of splitting the laser light emitted from the wavelength-variable laser into signal light and reference light;
a modulating step of modulating the signal light;
a reference light reflecting step of reflecting the reference light by a reference light mirror arranged on an optical path of the reference light;
an interfering step of causing an interference between the signal light that has been modulated in the modulating step and the reference light that has been reflected in the reference light reflecting step;
an interference light detecting step of detecting interference light created in the interfering step and outputting an interference light detection signal; and
a signal processing step of processing the interference light detection signal, wherein
the signal processing step includes a wavelength control signal generating step of generating an oscillation wavelength control signal for controlling an oscillation wavelength of the wavelength-variable laser based on the interference light detection signal, and when $ld_0$ denotes an initial optical path length that is a length of an optical path, along which the signal light travels, as converted using a refractive index in vacuum, $lm_0$ denotes an initial optical path length that is a length of an optical path, along which the reference light travels, as converted using a refractive index in vacuum, $\Delta l$ denotes a fluctuation width of a difference in optical path lengths between the signal light and the reference light as converted using a refractive index in vacuum, $\lambda_0$ denotes a central oscillation wavelength of the wavelength-variable laser, and $\Delta \lambda$ denotes an oscillation wavelength variable range of the wavelength-variable laser, then an initial optical path difference $|ld_0 - lm_0|$ satisfies Expression (5) below:

$$|ld_0 - lm_0| > \frac{\Delta l}{\Delta \lambda} \lambda_o. \tag{5}$$

* * * * *